US012638132B2

(12) United States Patent
Matthews et al.

(10) Patent No.: US 12,638,132 B2
(45) Date of Patent: May 26, 2026

(54) CRYOGENIC COOLING SYSTEM AND AN INSERT THEREFOR

(71) Applicant: Oxford Nanoscience Limited, Oxfordshire (GB)

(72) Inventors: Anthony Matthews, Oxfordshire (GB); Timothy Poole, Oxfordshire (GB); Chris Wilkinson, Oxfordshire (GB)

(73) Assignee: OXFORD NANOSCIENCE LIMITED, Abingdon (GB)

( * ) Notice: Subject to any disclaimer, the term of this patent is extended or adjusted under 35 U.S.C. 154(b) by 27 days.

(21) Appl. No.: 17/798,850

(22) PCT Filed: Feb. 16, 2021

(86) PCT No.: PCT/GB2021/050376
§ 371 (c)(1),
(2) Date: Aug. 10, 2022

(87) PCT Pub. No.: WO2021/170976
PCT Pub. Date: Sep. 2, 2021

(65) Prior Publication Data

US 2023/0090979 A1 Mar. 23, 2023

(30) Foreign Application Priority Data

Feb. 27, 2020 (GB) ...................................... 2002787

(51) Int. Cl.
*F25B 9/10* (2006.01)
*F17C 3/08* (2006.01)
(Continued)

(52) U.S. Cl.
CPC .............. *F17C 3/08* (2013.01); *F17C 13/006* (2013.01); *F25B 9/10* (2013.01); *F25B 9/12* (2013.01);
(Continued)

(58) Field of Classification Search
CPC ...... F25B 9/12; F25B 9/06; F25B 9/10; F17C 3/08
See application file for complete search history.

(56) References Cited

U.S. PATENT DOCUMENTS 4,854,131 A * 8/1989 Sakitani .................... F25B 9/10 248/638
5,381,666 A * 1/1995 Saho ......................... F25B 9/10 62/51.1

(Continued)

FOREIGN PATENT DOCUMENTS

EP 2409096 A2 1/2012
EP 2742299 A2 6/2014

(Continued)

OTHER PUBLICATIONS

WO-2010106309-A2 Translation (Year: 2010).*

(Continued)

*Primary Examiner* — David J Teitelbaum
(74) *Attorney, Agent, or Firm* — Blank Rome LLP

(57) ABSTRACT

A cryogenic cooling system is provided comprising a primary insert (118) and a demountable secondary insert (128). The primary insert (118) comprises a plurality of primary plates (111, 112), each primary plate having a primary contact surface, and one or more primary connecting members (117) arranged so as to connect the plurality of primary plates (111, 112). The demountable secondary insert (128) comprises a plurality of secondary plates (121, 122), each secondary plate having a secondary contact surface, and one or more secondary connecting members (127) arranged so as to connect the plurality of secondary plates (121, 122) such that the secondary insert (128) is self-supporting. One or more adjustment members are configured such that, when the secondary insert (128) is mounted to the primary insert (118), the adjustment members cause the primary and sec- (Continued)

ondary contact surfaces of the respective primary (111, 112) and secondary plates (121, 122) to be brought into conductive thermal contact.

30 Claims, 14 Drawing Sheets

(51) Int. Cl.
*F17C 13/00* (2006.01)
*F25B 9/12* (2006.01)
*F25B 9/14* (2006.01)
*F25D 19/00* (2006.01)

(52) U.S. Cl.
CPC ............ *F25B 9/145* (2013.01); *F25D 19/006* (2013.01); *F25B 2400/17* (2013.01)

(56) References Cited

U.S. PATENT DOCUMENTS

| | | | |
|---|---|---|---|
| 5,611,207 A | 3/1997 | Hess | |
| 6,604,365 B2 | 8/2003 | Sekimoto et al. | |
| 6,758,059 B2 | 7/2004 | Kelly et al. | |
| 7,287,387 B2 * | 10/2007 | Kirichek | F25D 19/006 62/295 |
| 2003/0126886 A1 | 7/2003 | Kelly et al. | |
| 2008/0104968 A1 | 5/2008 | Radovinsky et al. | |
| 2018/0372393 A1 | 12/2018 | Simpkins | |
| 2019/0353419 A1 | 11/2019 | Takahashi et al. | |

FOREIGN PATENT DOCUMENTS

| | | | |
|---|---|---|---|
| EP | 2409096 B1 | 8/2019 | |
| GB | 2538512 A | 11/2016 | |
| JP | 63118568 A | 5/1988 | |
| JP | 3580531 B | 10/2004 | |
| JP | 2019056519 A | 4/2019 | |
| WO | WO-2010106309 A2 * | 9/2010 | F25B 9/14 |
| WO | 2013021217 A2 | 2/2013 | |

OTHER PUBLICATIONS

International Search Report and Written Opinion from PCT/GB2021/050376 dated Feb. 16, 2021.
GB Search Report from GB 2002787.6 dated Nov. 20, 2020.
Canadian Office Action received in corresponding Canadian patent application No. 3,171,927, mail date Oct. 10, 2024.
Korean Office Action with English translation received in corresponding Korean patent application No. 10-2022-7029648, mail date Oct. 22, 2024.
Japanese Office Action and machine translation in English received in corresponding Japanese patent application 2022-550731, drafting date Nov. 25, 2024.
TRITON 200 Cryofree® Dilution Refrigerator, Liquid-Helium-Cooled Top-Loading Probe, Operator's Handbook, Issue V1.0, Business of Science®, Oxford Instruments, pp. 2-16.
Notice of Opposition with mail date Jul. 8, 2025, received in corresponding European Patent Application No. 23190115.8, Patent No. EP 4246064 B1.
Triton200 Cryofree® Dilution Refrigerator, Operator's Handbook, Issue 2.2, The Business of Science®, Oxford Instruments, @ Copyright 2009 Oxford instruments Superconductivity Ltd., All rights reserved.
Graham Batey and Gustav Teleberg, Principles of dilution refrigeration, A brief technology guide, Oxford Instruments, The Business of Science®, © Oxford Instruments Nanotechnology Tools Ltd., 2025. All rights reserved, pp. 1-17.
EP brief communication received in corresponding patent application No. 23190115.8/patent No. 4246064, mail date Feb. 17, 2026.

* cited by examiner

CRYOGENIC COOLING SYSTEM AND AN INSERT THEREFOR

CROSS REFERENCE TO RELATED APPLICATIONS

This application is a national stage of International Application No. PCT/GB2021/050376, filed Feb. 16, 2021, which claims priority to GB 2002787.6, filed Feb. 27, 2020, each of which are incorporated herein by reference in their entirety.

FIELD OF THE INVENTION

The invention relates to a cryogenic cooling system, in particular a cryogenic cooling system with a self-supporting demountable insert.

BACKGROUND TO THE INVENTION

Cryogenic cooling systems are commonly used to perform experiments at low temperatures below 100 Kelvin. Systems are generally customised for a specific experiment by installing experimental apparatus in a particular arrangement. Installation of experimental apparatus can be difficult and time consuming, commonly requiring the use of cranes or elevated platforms to access the system. Furthermore, testing is generally required after the installation of equipment to ensure it is functioning satisfactorily, which can take a significant amount of time. The more time spent installing and troubleshooting, the less time spent collecting experimental data.

Cryogenic cooling systems can reach millikelvin temperatures when in use, typically by including a number of platforms which are held at intermediate temperatures between room temperature and millikelvin temperatures. In this way, the cooling can be staged, such that the final platform of the system can provide continuous cooling to millikelvin temperatures. Installed experimental apparatus and other components of the system can provide a path from room temperature to the final platform. In order to prevent unintentional heating through these components, each platform provides a thermal sink to remove additional heat.

It is possible for experimental services to be assembled on a module outside a system and installed pre-assembled. This is typically faster than direct installation of experimental services. However, it is important for the module to be well thermalised, so that millikelvin temperatures can be obtained. In the prior art, thermalisation is achieved using clamps and/or complex and extensive adjustment processes.

It is the case that a minor offset will result in poor thermalisation within the system.

Low temperature physics experiments are becoming increasingly complex, and the experimental services required to perform the experiments is consequently increasing. Quantum Information Processing (QIP) experiments, for example, use radio-frequency (RF) wiring to address devices with large numbers of qubits. As the number of qubits scales up, the amount of RF wiring required correspondingly increases. Cryogenic cooling systems are expected to accommodate the growing amounts of experimental services. One way the growing demands can be accommodated is by providing modular upgrades for a core system. However, manufacturing tolerances can accumulate to result in mismatched joints and poorly thermalised platforms within the cryogenic cooling system, thus requiring extensive minor adjustments to improve performance.

It is desirable to have a more convenient way of installing experimental services in a cryogenic cooling system.

SUMMARY OF THE INVENTION

A first aspect of the invention provides a cryogenic cooling system comprising, when in use: a primary insert comprising: a plurality of primary plates, each primary plate having a primary contact surface; and one or more primary connecting members arranged so as to connect the plurality of primary plates; a demountable secondary insert comprising: a plurality of secondary plates, each secondary plate having a secondary contact surface; and one or more secondary connecting members arranged so as to connect the plurality of secondary plates such that the secondary insert is self-supporting; and one or more adjustment members; wherein the one or more adjustment members are configured such that, when in use, when the secondary insert is mounted to the primary insert, the adjustment members cause the primary and secondary contact surfaces of the respective primary and secondary plates to be brought into conductive thermal contact.

Advantageously, the system comprises adjustment members which cause the primary and secondary contact surfaces of the respective primary and secondary plates to be brought into conductive thermal contact with each other. This removes the need for numerous minor adjustments to overcome a misalignment between two portions of a cryogenic cooling system such that they are in effective thermal communication. When demounted, the secondary insert can also be moved with respect to the primary insert as a self-supporting body, which further simplifies the mounting and demounting process. For example, each plate of the secondary insert can be aligned with respect to the corresponding plate of the primary insert in a single step.

The one or more adjustment members may form part of the primary insert. In this case, the adjustment members may form part of the plurality of primary plates, or form part of the one or more primary connecting members, or form part of both the plates and the connecting members. Similarly, the one or more adjustment members may form part of the secondary insert. In this case, the adjustment members may form part of the plurality of secondary plates, or form part of the one or more secondary connecting members, or form part of both the plates and the connecting members. It is also possible for the adjustment members to form part of the primary insert and the secondary insert. Alternatively the adjustment members may take the form of fasteners that are configured to couple corresponding plates of the primary and secondary inserts. The choice of location of the adjustment members may depend on a specific implementation. For example, if the secondary insert is designed to accommodate rigid experimental apparatus, the position and type of adjustment member will be chosen accordingly.

The primary and secondary plates typically extend in a generally planar manner and are connected in use along mutually adjacent peripheral surfaces of the plates, and these may be stepped. Preferably, the conductive thermal contact between a primary plate and the corresponding secondary plate is provided by area contact between conformal planar regions of the respective primary and secondary contact surfaces. Each of the primary and secondary plates may comprise a flange. When a primary plate is brought into contact with the corresponding secondary plate, a lower surface of the flange of the primary plate matches an upper surface of the flange of the secondary plate to form a continuous structure. Typically, the primary plates and the secondary plates are formed from a high conductivity material and thus a joint in which the plates are intimately connected over a large area will provide a good thermal connection across the joint.

The adjustment members typically cause the primary and secondary contact surfaces of the respective primary and secondary plates to be brought into conductive thermal contact by accommodating a misalignment between each of the plurality of secondary plates of the demountable secondary insert and the corresponding primary plate of the primary insert. There may be a misalignment between primary and secondary plates as a result of manufacturing tolerances. Any misalignment between plates, if left unadjusted, will reduce the thermal conductance between plates.

Although the cryogenic cooling system comprises both a primary insert and a secondary insert, the secondary insert (or, alternatively, the primary insert) is demountable and thus is removable from the system. When the secondary insert is in a demounted state, the secondary plates are typically spatially positioned with respect to one another in a secondary configuration. The secondary insert is self-supporting in its demounted state, and the spacing between adjacent plates within the secondary insert may be determined by the secondary connecting members. Similarly, when the secondary insert is in a demounted state, the primary plates are typically spatially positioned with respect to one another in a primary configuration. The spacing between adjacent plates within the primary insert may be determined by the primary connecting members.

During a mounting process, the secondary insert may be mounted to the primary insert. A plate of the secondary insert is preferably configured to be brought into contact with a corresponding plate of the primary insert. However, there may be a misalignment between the above-mentioned plates. The misalignment may be the offset between the plane of a secondary plate and the plane of the corresponding primary plate in the respective primary and secondary configurations. Each pair of plates may have a different misalignment, and the misalignment may be positive or negative. Consequently, each adjustment member may provide a different level of adjustment, and typically is capable of providing a range of motion of at least 2 millimetres, preferably at least 4 millimetres in order to accommodate the misalignment.

The secondary insert is demountable from the cryogenic cooling system. The secondary insert may be fully demounted, i.e. all of the plates of the secondary insert may be separated from the primary insert and removed. Optionally, the secondary insert may only be partially demounted. If the secondary insert is partially demounted, some of the plates of the secondary insert remain attached to the primary insert, whilst the remainder of the plates of the secondary insert are removed from the primary insert. Preferably, one or more of the secondary connecting members are removable such that two or more of the plurality of secondary plates may be detached from the demountable secondary insert as a unitary, self-supporting body or assembly.

The secondary insert may comprise a first secondary plate, a second secondary plate and a third secondary plate connected using secondary connecting members, wherein the second secondary plate is positioned between the first and the third secondary plate. If the secondary connecting members connecting the second secondary plate and the third secondary plate are removed, the second secondary plate and the first secondary plate may be removed as a unitary structure. The partially demounted secondary insert (the first and second secondary plates) is preferably self-supporting in a similar way to the self-supporting nature of the fully demounted secondary insert.

The demountable nature of the secondary insert advantageously allows the secondary insert to be modified away from the cryogenic cooling system. However, in cases in which it is not necessary to remove the entire secondary insert, it may be beneficial to leave a portion of the secondary insert attached to the primary insert. For example, as low-temperature experiments are typically performed in a vacuum, one of the joints between the primary insert and the secondary insert may form part of a barrier between atmospheric pressure and low pressure. Therefore, additional sealing may be required such as the use of an o-ring or other vacuum seal such as to reduce the possibility of any gas leaks. It may be beneficial to leave the plates forming the above-mentioned barrier in place to avoid repeatedly reforming the seal.

An advantage of the secondary insert being demountable from the cryogenic cooling system is the ability to assemble, modify and test experimental services mounted to the secondary insert away from the cryogenic cooling system. Furthermore, the modifications may only need to be performed on two, or any number of, plates of the secondary insert. It may be easier and therefore preferable to partially demount the secondary insert, only removing the necessary plates.

Typically, experimental services are positioned within the cryogenic cooling system and are used to perform experiments at low temperatures. Preferably, one or more the plurality of secondary plates is configured to accommodate experimental apparatus. This is particularly advantageous if the experimental apparatus mounted to the secondary insert is complex and time-consuming to assemble. The experimental services can hence be assembled and tested away from the cryogenic cooling system before being mounted to the primary insert.

The cryogenic cooling system can be used for low temperature experimental procedures and cooling can be achieved using a number of refrigeration apparatus. It is particularly desired for such systems to achieve millikelvin temperatures. To this end, a dilution unit preferably forms part of the cryogenic cooling system, for example the primary insert may comprise a dilution refrigerator or components thereof. The dilution refrigerator may be thermally coupled to one or more plates of the primary insert. Alternatively the primary insert may comprise a helium-3 refrigerator or a 1 kelvin pot. In such a way, one or more plates of the primary insert may attain millikelvin temperatures. The conductive thermal contact between the primary insert and the secondary insert ensures that the secondary insert may reach similarly low temperatures during operation.

One or more of the primary plates or the secondary plates may comprise a rigid portion and one or more deformable portions. Preferably, the deformable portions are deformable with respect to the rigid portions to accommodate the misalignment. The one or more adjustment members may hence comprise the one or more deformable portions. During the mounting of the demountable secondary insert to the primary insert, the one or more deformable portions may locally deform so as to cause the conductive thermal contact. The deformable portions of the plates may be provided at the plate edges, for example in the form of flanges. One advantage of this mode of adjustment is the ability to maintain the primary and/or secondary configurations within the respective inserts. For example, operation of the adjustment member may not change the separation between adjacent primary plates of the primary insert or adjacent secondary plates of the secondary insert. In practice this means that the primary or secondary inserts respectively can remain fixed and can therefore accommodate rigid experimental apparatus which is mounted to more than one plate. Similarly, the separation between corresponding plates of the primary and secondary inserts respectively can remain fixed. The deformation may be configured to occur locally, in pre-defined areas of a plate, such that experimental apparatus is not damaged, but conductive thermal contact is nevertheless achieved. The deformable portions may form part of the primary plates. Alternatively, the deformable portions may form part of the secondary plates. The deformable portions may optionally form part of both the primary plates and the secondary plates.

When the secondary insert is in a demounted state, the primary and secondary inserts may have respective primary and secondary configurations as described above. If the adjustment is achieved through local deformation, it is possible for the primary and secondary configurations to be maintained even when the demountable secondary insert is in a mounted state. The one or more adjustment members may alternatively cause one or both of the primary or secondary configurations to be adjustable so as to cause the conductive thermal contact. For example, the one or more adjustment members are configured to change the separation between adjacent primary plates or adjacent secondary plates. This may be achieved by configuring each of the one or more primary connecting members or secondary connecting members to deform so as to accommodate the misalignment between plates.

The one or more adjustment members may form at least part of one or more of the primary connecting members or secondary connecting members. For example, the one or more adjustment members may form respective flexible portions of the primary or secondary connecting members. During the mounting of the secondary insert to the primary insert, a misalignment could be accommodated by placing the secondary connecting members under a compressive or tensile load. In response to the load, the secondary connecting members would deform thus causing the conductive thermal contact by bringing the secondary plate into alignment with the corresponding primary plate. Similarly, a misalignment could be accommodated through the deformation of flexible primary connecting members.

Alternatively, the one or more adjustment members may be configured to allow movement of the one or more primary plates with respect to the one or more said primary connecting members, or the one or more adjustment members may be configured to allow movement of the one or more secondary plates with respect to the one or more said secondary connecting members. For example, the primary or secondary connecting members may be rotatable so as to change the separation between adjacent primary plates or adjacent secondary plates using the one or more adjustment members. This adjustment may generally be achieved where an end of the primary or secondary connecting members comprises a screw or tapped portion. In this case the adjustment member may comprise said screw or tapped portion of a connecting member in combination with a receiving member configured to engage with the screw or tapped portion so as to adjust the separation between adjacent plates of the primary or secondary insert.

Preferably, the primary and secondary connecting members are thermalised at the respective primary and secondary plates. Typically there is a heat load conducted from room temperature along the primary and/or secondary connecting members to the lower temperature stages of the system. Thermalisation at the plates advantageously intercepts this heat load, thereby forming a thermal sink that enables distal stages of the primary or secondary insert to obtain lower temperatures during operation of the system. Effective thermalisation of the primary connecting members may be achieved through the use of one or more primary shims, each said primary shim thermally coupling a said primary plate to one or more said primary connecting members and configured to allow movement of the said primary plate with respect to the said one or more primary connecting members. Similarly, effective thermalisation of the secondary connecting members may be achieved through the use of one or more secondary shims, each said secondary shim thermally coupling a said secondary plate to one or more said secondary connecting members and configured to allow movement of the said secondary plate with respect to the said one or more secondary connecting members.

Further aspects of the invention will now be described. Any features discussed in connection with one aspect are equally applicable in respect of the remaining features and each aspect shares similar advantages.

A second aspect of the invention provides a demountable secondary insert for use in a cryogenic cooling system in accordance with the first aspect.

A third aspect of the invention provides a method of operating the system according to the first aspect, wherein the secondary insert comprises a first secondary plate, a second secondary plate and a third secondary plate, a first secondary connecting member connecting the first secondary plate to the second secondary plate, and a second secondary connecting member connecting the second secondary plate to the third secondary plate, and wherein the primary insert comprises three primary plates, each said primary plate corresponding to a respective secondary plate of the secondary insert, the method comprising: mounting the secondary insert to the primary insert such that secondary plates are thermally coupled to the corresponding primary plates using the one or more adjustment members; and partially demounting the secondary insert from the primary insert, wherein partially demounting the secondary insert comprises: removing the first secondary connecting member from the secondary insert; and removing the second secondary plate, the third secondary plate and the second secondary connecting member from the primary insert as a unitary self-supporting assembly, without removing the first secondary plate from the corresponding plate of the primary insert.

BRIEF DESCRIPTION OF THE DRAWINGS

Embodiments of the invention will now be described with reference to the accompanying drawings in which:

FIG. 8(*b*) is a schematic illustration of part of a cryogenic cooling system in accordance with the first embodiment of the invention after thermal connection is made;

FIG. 9(*b*) is a second schematic illustration of part of a cryogenic cooling system in accordance with the second embodiment of the invention;

FIG. 10(*b*) is a schematic illustration of part of a cryogenic cooling system in accordance with the third embodiment of the invention after thermal connection is made;

DETAILED DESCRIPTION

Figure 1:
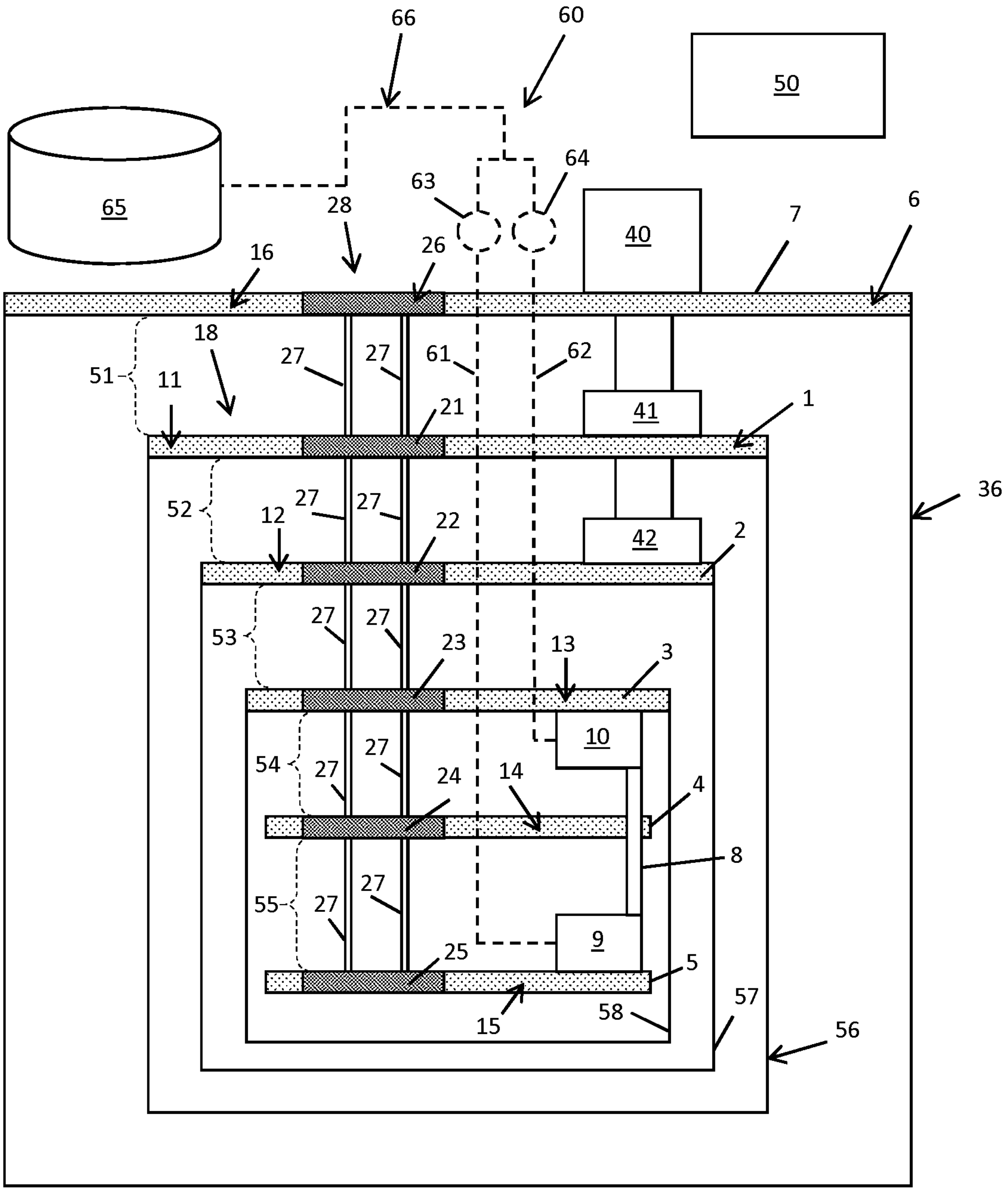
FIG. 1 is a schematic illustration of a cryogenic cooling system in accordance with a first embodiment of the invention.

FIG. 1 provides a sectional view of the interior of a cryogenic cooling system according to a first embodiment. The system comprises a plurality of thermal stages 1-5 and an outer stage 6. The thermal stages 1-5 and outer stage 6 are connected by primary and secondary rods 17, 27, thus forming a tiered assembly in which the stages are aligned and spatially dispersed along a central axis extending parallel to the rods. The primary rods 17 are not shown in FIG. 1 for clarity. The primary and secondary rods 17, 27 are formed from a low thermal conductivity material such as stainless steel. When in use, the thermal stages 1-5 are contained within a cryostat 36, which is typically evacuated to improve the thermal performance by the removal of convective and conductive heat paths through any gas within the cryostat 36. The cryostat 36 is mounted to the outer stage 6, and the outer surface 7 of the outer stage 6 is exposed to room temperature and pressure and is formed from a low conductivity material.

The cryogenic cooling system comprises cooling apparatus. The cooling apparatus cools the cryogenic cooling system from room temperature to an operational base temperature. The cryogenic cooling system in the first embodiment is substantially cryogen-free (also referred to in the art as “dry”) in that it is not principally cooled by contact with a reservoir of cryogenic fluid. However, despite being substantially cryogen-free, some cryogenic fluid is typically present within the cryostat when in use, including in the liquid phase, as will become clear. In this embodiment, the cooling is achieved by use of a mechanical refrigerator and a dilution unit. The mechanical refrigerator may be a pulse-tube refrigerator (PTR), a Stirling refrigerator, or a Gifford-McMahon (GM) refrigerator.

In this embodiment, the mechanical refrigerator is a PTR 40, and is thermally coupled to the first thermal stage 1 and the second thermal stage 2. Each thermal stage 1-5 is formed from a high conductivity material such as copper and has a different operational base temperature. The first thermal stage 1 is thermally coupled to a first PTR stage 41 and attains an operational base temperature of about 50 to 70 kelvin. The second thermal stage 2 is thermally coupled to a second PTR stage 42 and attains an operational base temperature of about 3 to 5 kelvin. In this embodiment, the second PTR stage 42 forms the lowest temperature stage of the PTR 40.

The third thermal stage 3, fourth thermal stage 4 and fifth thermal stage 5 are thermally coupled to a dilution unit 8. The cooling of the third, fourth and fifth thermal stages 3, 4, 5 is achieved through operation of the dilution unit 8, in which an operational fluid is circulated around a cooling circuit 60. The operational fluid is typically a mixture of helium-3 and helium-4. The operational fluid is pumped around the cooling circuit 60 which comprises a condensing line 61 and a still pumping line 62 using a compressor pump 63 and a turbomolecular pump 64. The operational fluid can be stored in a storage vessel 65 and supplied to the cooling circuit 60 using a supply line 66. The third thermal stage 3 is thermally coupled to a still 10 which forms part of the dilution unit 8. The operational base temperature of the third thermal stage 3 is typically 0.5 to 2 kelvin. The fifth thermal stage 5 is thermally coupled to a mixing chamber 9 of the dilution unit 8. The operational base temperature of the fifth thermal stage 5 is typically 3 to 30 millikelvin. The fourth thermal stage 4 forms an intermediary stage between the third and fifth thermal stages 3, 5 and has an operational base temperature of about 50 to 200 millikelvin.

In use, a number of heat radiation shields 56-58 are attached to the thermal stages 1-5, wherein each shield encloses each of the remaining lower base-temperature components. The first heat radiation shield 56, second heat radiation shield 57 and third heat radiation shield 58 are attached to the first thermal stage 1, second thermal stage 2, and third thermal stage 3 respectively. This reduces any unwanted thermal communication between the thermal stages 1-5 and allows the stages to attain different operational base temperatures.

The cryogenic cooling system of FIG. 1 can be controlled using a control system 50. The control system 50 is typically a suitable computer system, although it is possible to have manual control of the system. The operation of each part of the system can be controlled using the control system 50, including the operation of the PTR 40, the dilution unit 8, pumps 63, 64 and associated valves; the monitoring of temperature and pressure sensors; and the operation of other ancillary equipment to perform desired procedures.

A cryogenic cooling system as described can be used to perform experiments at low temperatures, generally below 100 kelvin. Although not shown in FIG. 1, experimental services can be mounted within the cryostat 36. The choice of experimental services and their particular arrangement within the cryostat 36 is customisable. One such example of experimental services will be discussed with reference to FIG. 6. Typically a particular arrangement of experimental services is installed, tested, and remains fixed for a period of time. Modification of the arrangement within the system to perform a different type of experiment is typically very time consuming, requiring numerous adjustments and troubleshooting procedures before the experiment can be run. Embodiments of the invention provide a primary insert 18 and a secondary insert 28, wherein the secondary insert 28 is demountable from the primary insert 18. Experimental services can hence be mounted to the primary insert 18 or to the secondary insert 28, which is easy to remove and reinstall, or to both the primary and secondary inserts 18, 28. The primary insert 18 comprises a plurality of primary plates and the secondary insert 28 comprises a plurality of secondary plates 21-26, wherein each primary plate is configured to fit to a corresponding secondary plate in order to form a respective thermal stage 1-5 of the system, as will be further discussed.

An advantage of mounting the experimental services to the secondary insert 28 arises from the ability to remove the secondary insert 28 from the cryogenic cooling system. Assembly and preliminary tests can be performed 'on the bench', outside the cryogenic cooling system in which the experiment will be performed. In this way, modifying or updating the experimental services to run a different experiment can be performed relatively quickly and easily. Low-temperature experiments using a cryogenic cooling system such as a dilution refrigerator typically take days, weeks or months to perform. Modifications to the experimental services within the system lead to experimental down time, i.e. time during which the cryogenic cooling system is not at operational base temperature, as the modifications typically need to be performed at room temperature. The ability to manipulate experimental services on the demounted secondary insert 28 on the bench (remote from the system itself) reduces the experimental down time. For example, multiple secondary inserts may be provided for use with a given cryogenic cooling system. Adjustments may be made to experimental services on a first secondary insert under atmospheric conditions whilst a cryogenic environment is maintained in the system for performing experiments on a second secondary insert.

Embodiments of the invention also provide adjustment members which cause the primary insert 18 and the secondary insert 28 to be brought into conductive thermal contact. Good thermal contact is important to achieve when performing low temperature measurements. In the presence of a heat flux, for example as generated by operation of a cooling source, a temperature gradient will naturally arise between the primary insert 18 and the secondary insert 28. The difference in temperature between these components will be proportional to the heat flux and inversely proportional to the thermal conductance. For any practical experiment there is a limit to the heat flux that can be applied to the system (as the cooling power available from either of the PTR stages 41, 42 or the dilution refrigerator 8 is finite). The thermal conductance of a joint will vary depending on numerous factors including its temperature and contact pressure. The adjustment members are typically configured to limit the temperature difference between corresponding stages of the primary and secondary inserts 18, 28, for example to within 2%, and preferably within 1%, of the absolute temperature of the higher temperature stage. This is achieved by making the thermal conductance between these stages sufficiently high. For example, where the second thermal stage 2 is cooled to 4 kelvin by the second PTR stage 42 (at a cooling power of 1 watt), the adjustment member for the second thermal stage 2 may ensure that the temperature difference between corresponding primary and secondary plates of the second thermal stage 2 does not exceed 40 millikelvin. The thermal conductance between primary and secondary plates of the second thermal stage 2 is therefore approximately 25 W/K at 4 kelvin. Similarly, where the fifth thermal stage 5 is cooled to 100 millikelvin by the mixing chamber 9 (at a cooling power of 400 microwatts), the adjustment member of the fifth thermal stage 5 may ensure the temperature difference between corresponding primary and secondary plates of the fifth thermal stage 5 does not exceed 1 millikelvin. The thermal conductance between primary and secondary plates of the fifth thermal stage 5 is therefore approximately 0.4 W/K at 0.1 kelvin.

The fact that there is a difference in thermal conductance expected at the second thermal stage 2 and the fifth thermal stage 5 is due to the temperature dependence of a joint, as discussed further in "Pressed copper and gold-plated copper contacts at low temperatures—A review of thermal contact resistance" by R. C. Dhuley, published in Cryogenics 101 (2019) 111-124. The thermal conductance of a given joint will decrease with temperature. However as the practical heat flux that can be applied between each primary and secondary plate in the respective primary and secondary inserts 18, 28 also decreases with temperature, all of the mounting arrangements between the primary and secondary plates can be designed and mounted in the same way to provide acceptable performance at each thermal stage 1-5.

A variety of adjustment members are envisaged and embodiments facilitating different methods of adjustment will be described.

Figure 2:
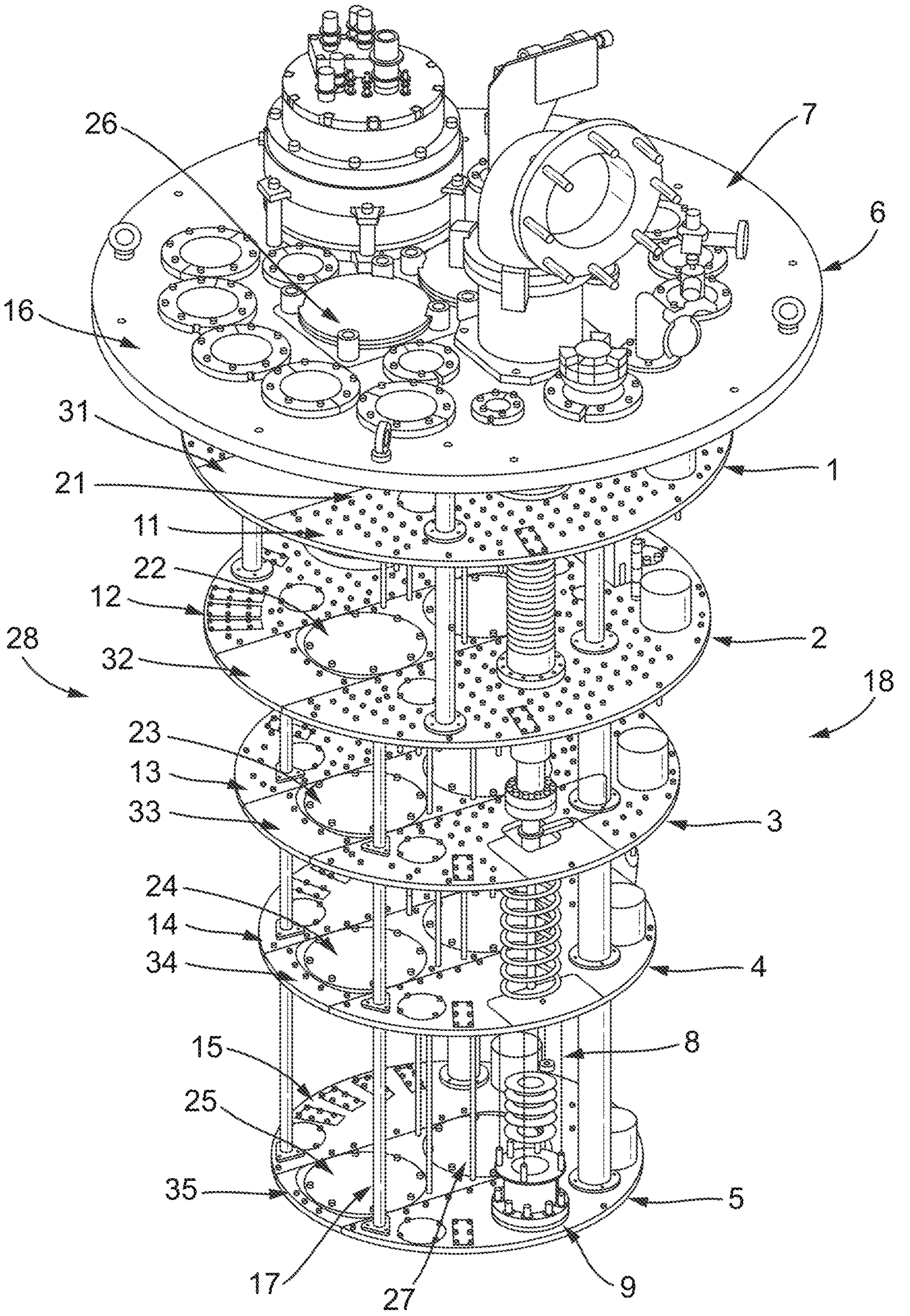
FIG. 2 is a perspective view of a cryogenic cooling system in accordance with the first embodiment of the invention.

FIG. 2 shows the primary and secondary inserts 18, 28 from FIG. 1 in further detail. As shown, each thermal stage 1-5 comprises an inner primary plate 11-15, an inner secondary plate 21-25, and an edge piece 31-35. The outer stage 6 comprises an outer primary plate 16 and an outer secondary plate 26. Each of the inner and outer secondary plates 21-25, 26 are connected to the corresponding inner and outer primary plates 11-15, 16 along a peripheral portion of the secondary plates. Each of the edge pieces 31-35 are connected to the corresponding inner primary plates 11-15 and the corresponding inner secondary plates 21-25 along a peripheral portion of the respective inner primary and secondary plates. The inner and outer primary plates 11-15, 16 are connected by primary rods 17, and the inner and outer secondary plates 21-25, 26 are connected by secondary rods 27. The primary and secondary rods 17, 27 extend between the plates in a direction normal to the plates. In this embodiment, the edge pieces 31-35 are not connected, but in an alternative embodiment the edge pieces 31-35 may be connected by edge rods extending between the edge pieces.

The inner and outer primary plates 11-15, 16 and primary rods 17 form part of a primary insert 18. The inner and outer secondary plates 21-25, 26 and secondary rods 27 form part of a secondary insert 28. The secondary insert 28 is demountable from the cryogenic cooling system and, in particular, the primary insert 18. When the secondary insert 28 is in a demounted state, it forms a self-supporting assembly, which does not require any additional support structures to maintain its original configuration and can be removed from the primary insert 18 as a unitary body.

The designs of the secondary insert 28 and primary insert 18 are such that good thermal contact will be achieved between any secondary insert 28 and primary insert 18 when the secondary insert 28 is in a mounted state. It is important to ensure effective thermalisation between corresponding plates in the primary insert 18 and secondary insert 28 so that any cooling applied to one of the primary or secondary plates can be effectively applied to the other of the secondary or primary plates.

Achieving good thermal contact between any secondary insert 28 and primary insert 18 when the secondary insert 28 is in a mounted state is not trivial. During manufacture of a primary insert 18 or a secondary insert 28, the relative positioning of the inner and outer primary plates 11-15, 16 and the inner and outer secondary plates 21-25, 26 within their respective inserts 18, 28 may vary within certain manufacturing tolerances, even if made to the same specification. Small differences can lead to a misalignment, i.e. an offset between the plane of a secondary plate and the plane of the corresponding primary plate when the secondary insert 28 is brought into a mounted position. Any such misalignment, even if small, can lead to poor thermal contact. This is of particular importance at low temperatures such as the operational base temperatures of the third, fourth and fifth thermal stages 3, 4, 5.

In order to achieve good thermal contact between corresponding plates in the primary insert 18 and secondary insert 28, the cryogenic cooling system also comprises adjustment members (examples of which will be described in further detail below) which cause the inner primary plates 11-15 and inner secondary plates 21-25 to be brought into conductive thermal contact when the secondary insert 28 is in a mounted state thus accommodating a misalignment. The adjustment members may form part of the primary insert 18 or part of the secondary insert 28 or part of both.

Figure 3:
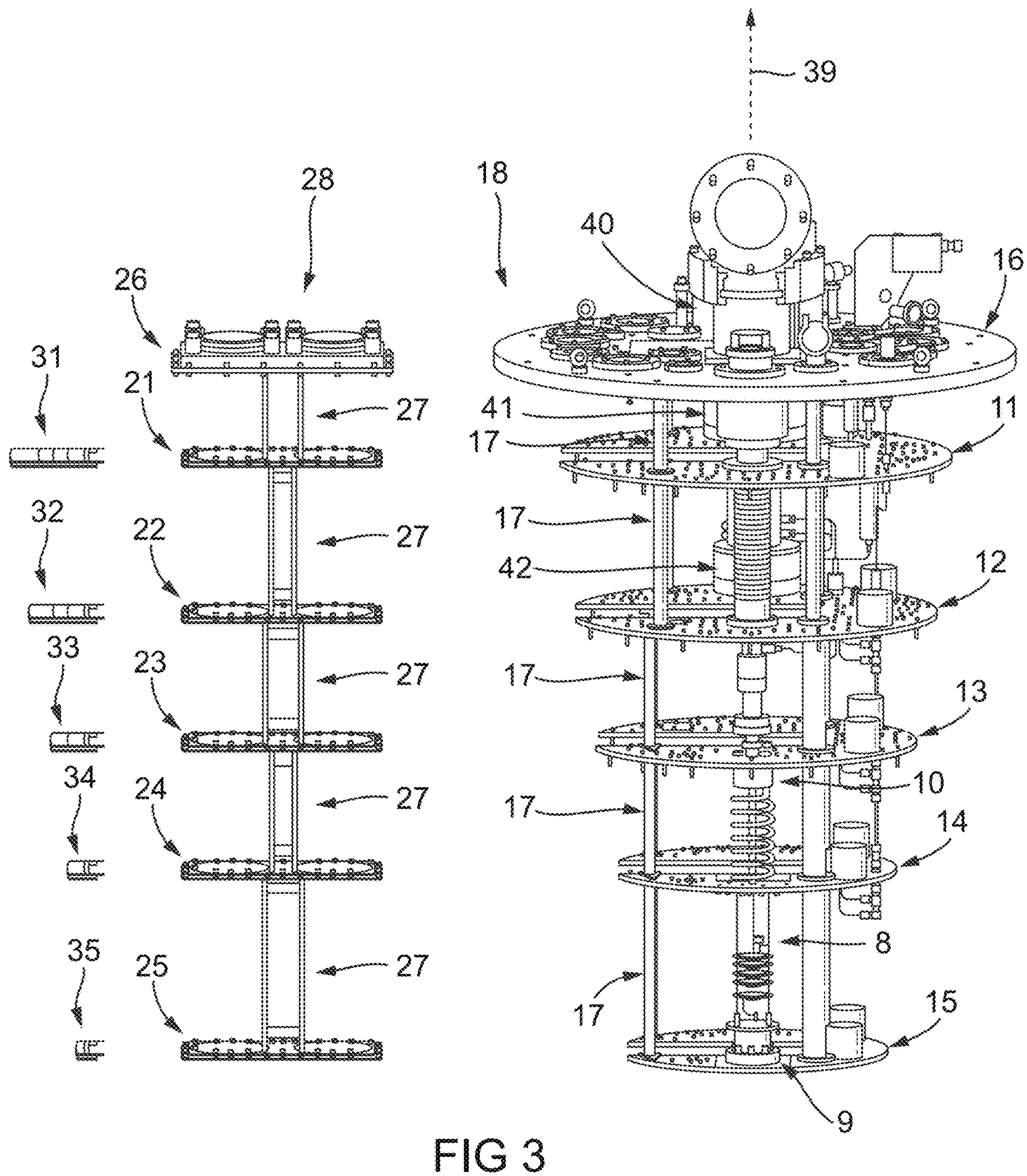
FIG. 3 is an exploded side view of a cryogenic cooling system in accordance with the first embodiment of the invention.

In FIG. 2, the components of the cryogenic cooling system are shown in a mounted position. FIG. 3 provides an exploded view of the cryogenic cooling system according to the first embodiment with the secondary insert 28 and edge pieces 31-35 removed from the primary insert 18 to more clearly show the component parts of the system. FIG. 3 shows the edge pieces 31-35, the secondary insert 28 comprising a plurality of inner secondary plates 21-25 and an outer secondary plate 26 connected by secondary rods 27, and the primary insert 18 comprising a plurality of inner primary plates 11-15 and an outer primary plate 16 connected by primary rods 17.

In this embodiment, the cooling apparatus is attached to the primary insert 18. The cooling apparatus includes a PTR 40, comprising a first PTR stage 41 thermally coupled to the first inner primary plate 11 of the first thermal stage 1 and a second PTR stage 42 thermally coupled to the second inner primary plate 12 of the second thermal stage 2. The cooling apparatus further comprises a dilution unit 8, wherein a still 10 of the dilution unit 8 is thermally coupled to the primary plate 13 of the third thermal stage 3 and a mixing chamber 9 of the dilution unit 8 is thermally coupled to the primary plate 15 of the fifth thermal stage 5. In an alternative embodiment, the cooling apparatus is attached to the secondary insert. For example, the dilution unit may alternatively be mounted to the inner secondary plates 23, 24, 25 of the third, fourth and fifth thermal stages 3, 4, 5.

The inner and outer plates 11-15, 16 of the primary insert 18 are aligned along an axis 39 extending normal to the inner and outer primary plates 11-15, 16 in a primary configuration. Similarly, the inner and outer plates 21-25, 26 of the secondary insert 28 are aligned and spatially dispersed along a central axis normal to the inner and outer plates 21-25, 26 of the secondary insert 28 in a secondary configuration. There may be an offset between the plane of a secondary plate and the plane of the corresponding primary plate in the respective primary and secondary configurations, referred to as a misalignment. Each of the inner secondary plates 21-25 is configured to be brought into conductive thermal contact with its corresponding inner primary plate 11-15 when the secondary insert 28 is mounted to the primary insert 18, thus accommodating any misalignment. Such conductive thermal contact is caused by adjustment members. The outer secondary plate 26 forms a vacuum seal with the outer primary plate 16, for example through use of o-rings although any suitable sealing mechanism is possible.

The installation of the secondary insert 28 into the cryogenic cooling system will now be described with reference to FIG. 3. Firstly, the secondary insert 28 is aligned with the primary insert 18 in two dimensions, with each inner and outer secondary plate 21-25, 26 positioned slightly below the corresponding inner and outer primary plate 11-15, 16. Secondly, the secondary insert 28 is aligned in the third dimension, wherein the third dimension is parallel to a major axis 39 of the primary insert 18. The alignment in the third dimension with the primary insert 18 is achieved by raising the secondary insert 28 such that each inner and outer secondary plate 21-25, 26 is brought towards its corresponding inner and outer primary plate 11-15, 16 so as to form conductive thermal contact between each pair of primary and secondary plates. The outer secondary plate 26 of the outer stage 6 forms a seal with the outer primary plate 16. The inner secondary plates 21-25 can then be fixed into place. In this embodiment they are fixed using fastening members, here in the form of screws. The adjustment members (not shown) cause the inner primary plates 11-15 and inner secondary plates 21-25 to be brought into conductive thermal contact in the mounted state. Finally, the edge pieces 31-35 are fixed into place, using screws.

Each edge piece 31-35 is shaped so as to shield lower base-temperature components from excess radiation. As can be seen from FIG. 3, the shape of each edge piece 31-35 is designed to match the shape of each inner secondary plate 21-25 and each inner primary plate 11-15 to complete each thermal stage 1-5. In an alternative embodiment, the edge pieces 31-35 can be mounted to the inner primary plates 11-15 without a secondary insert 28 in place. In another embodiment, the edge pieces are not required. Instead, each inner secondary plate 21-25 may be shaped so as to complete each thermal stage 1-5 and act as a thermal shield to block radiation between the adjacent stages.

Figure 4:
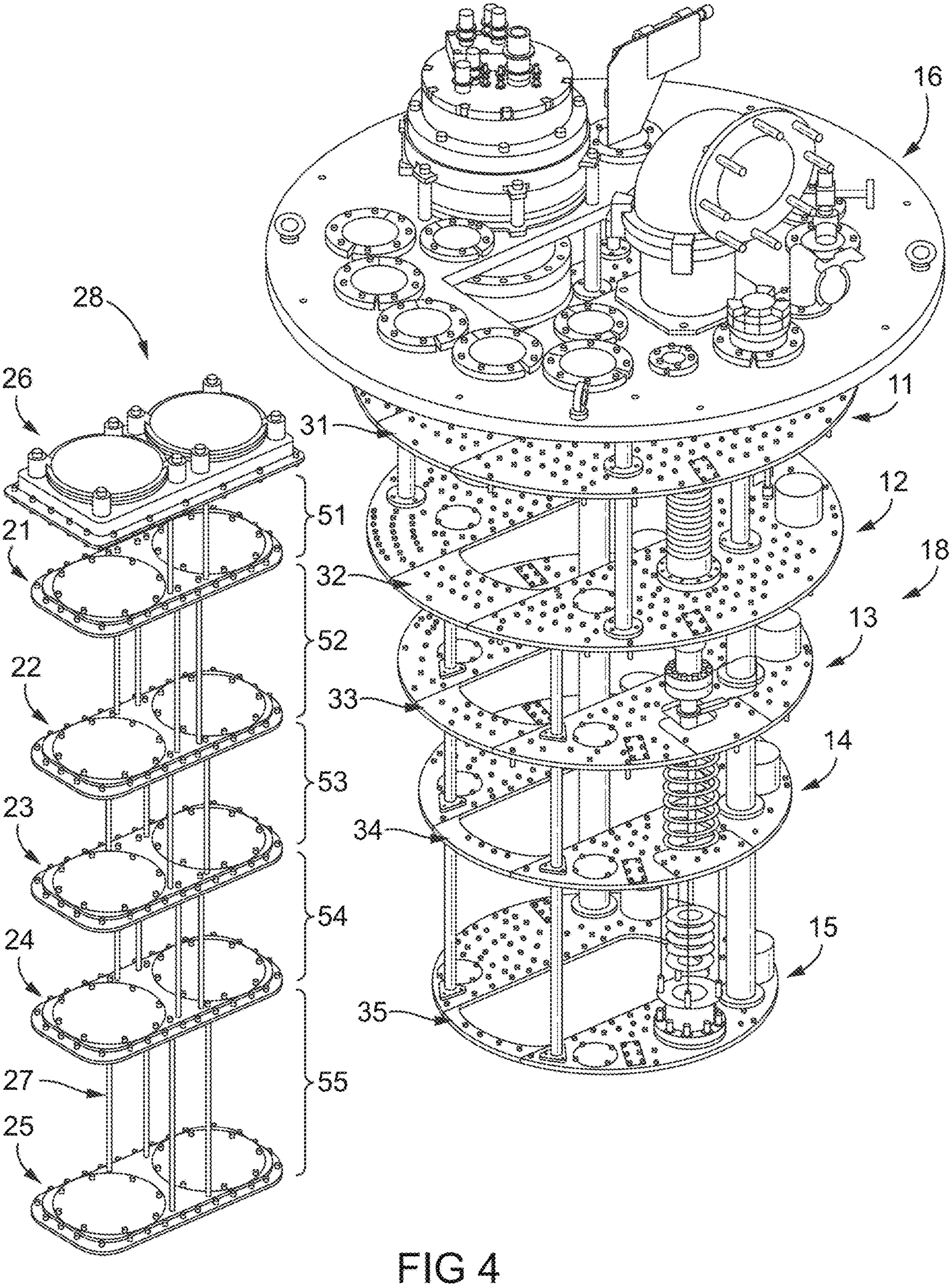
FIG. 4 is a first exploded perspective view of a cryogenic cooling system in accordance with the first embodiment of the invention.

The secondary insert 28 of the cryogenic cooling system is demountable from the primary insert 18. FIG. 4 shows the cryogenic cooling system in accordance with the first embodiment, with the secondary insert 28 in a demounted position and the edge pieces 31-35 attached to the corresponding inner primary plates 11-15.

Whilst the secondary insert 28 is in a demounted position, modifications can be made to the secondary insert 28 and particularly the experimental services mounted to the secondary insert 28. This is practically easier for the user to achieve in the demounted position. Modifications to the secondary insert 28 may include, for example, updating or testing the experimental services mounted to the secondary insert 28. If desired, an upgraded secondary insert 28 may then be mounted to the primary insert 18. Furthermore, it may be advantageous to have more than one secondary insert 28 in order to have one secondary insert 28 in operation, i.e. in a mounted state and in experimental use, and one or more secondary inserts 28 on the bench, i.e. in a demounted state. Whilst in a demounted state, the experimental services on the secondary insert 28 can be modified or upgraded more easily. The experimental services on the demounted secondary insert 28 can be tested at room temperature, or the secondary insert 28 can be mounted into a donor cryostat to test the experimental services at low temperatures. The above testing, assembly, modification and upgrades can be performed in parallel to an experiment being performed in the cryogenic cooling system.

As described above, the secondary insert 28 forms a tiered assembly. The spatial distribution of the inner and outer secondary plates 21-25, 26 within the assembly defines five inter-plate spaces 51-55 as shown in FIG. 4: a first inter-plate space 51 between the outer secondary plate 26 and the first inner secondary plate 21, a second inter-plate space 52 between the first inner secondary plate 21 and the second inner secondary plate 22, a third inter-plate space 53 between the second inner secondary plate 22 and the third inner secondary plate 23, a fourth inter-plate space 54 between the third inner secondary plate 23 and the fourth inner secondary plate 24, and a fifth inter-plate space 55 between the fourth inner secondary plate 24 and the fifth inner secondary plate 25.

Figure 5:
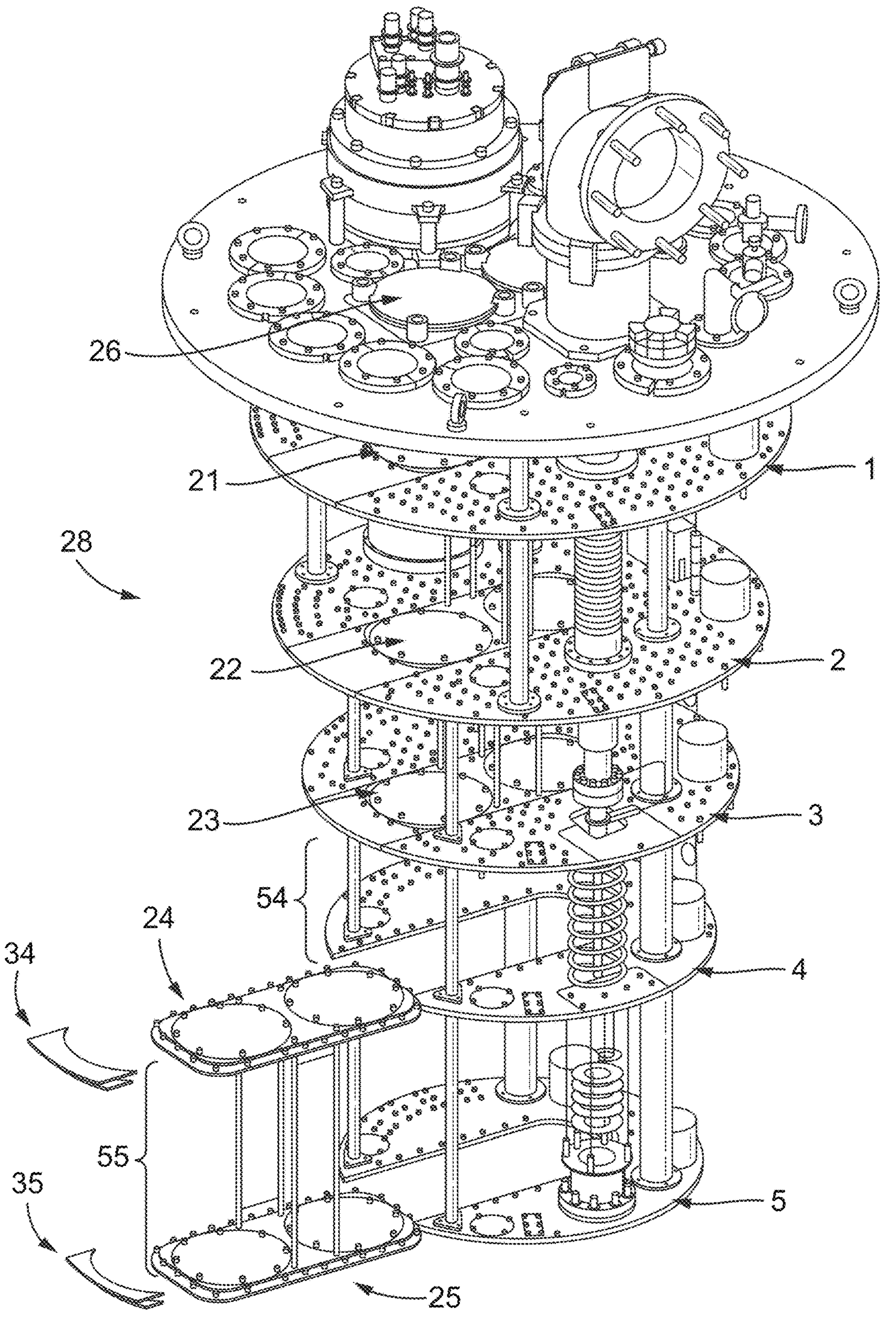
FIG. 5 is a second exploded perspective view of a cryogenic cooling system in accordance with the first embodiment of the invention.

In FIG. 4, a group of four secondary rods 27 extends across each respective inter-plate space 51-55 connecting each pair of adjacent secondary plates 21-26. The arrangement of each group of secondary rods 27 is offset with respect to the adjacent group to allow each rod from a respective inter-plate space 51-55 to be adjusted or removed independently. Removal of all of the secondary rods 27 in one of the inter-plate spaces 51-55 allows the secondary insert 28 to be divided into two parts. Two or more plates of the secondary insert 28 can hence be removed from the remaining plates as a unitary structure. FIG. 5 illustrates a cryogenic cooling system according to the first embodiment in which the secondary insert 28 is partially demounted.

In FIG. 5 the secondary rods 27 in the fourth inter-plate space 54 have been removed. The fourth inter-plate space 54 is between the third inner secondary plate 23 and the fourth inner secondary plate 24, and thus the removal of the above secondary rods 27 allows the fourth inner secondary plate 24 and the fifth inner secondary plate 25 to be demounted from the cryogenic cooling system whilst leaving the remaining inner and outer secondary plates 21-23, 26 mounted. The fourth and fifth inner secondary plates 24, 25 remain held together by connecting secondary rods 27, and therefore this assembly is still self-supporting once it has been demounted from the cryogenic cooling system. In alternative embodiments, any number of the inner and outer secondary plates 21-25, 26 can be removed.

Depending on the experimental circumstances, it may only be necessary to test or modify only a subset of the secondary plates 21-26 of the secondary insert 28. Partial removal of the secondary insert 28 is therefore advantageous as it allows for more flexible preparation and testing of experimental services. In addition, re-installation of a part of the secondary insert 28 as opposed to the whole secondary insert 28 is less complex for a user to perform. The cryogenic cooling system can be operated with the inner secondary plates 21-25 removed. However, if the inner secondary plates 21-24 of any of the first to fourth thermal stages 1-4 are removed, then they should generally be replaced with blanks to reduce radiation transfer between the thermal stages.

Figure 6:
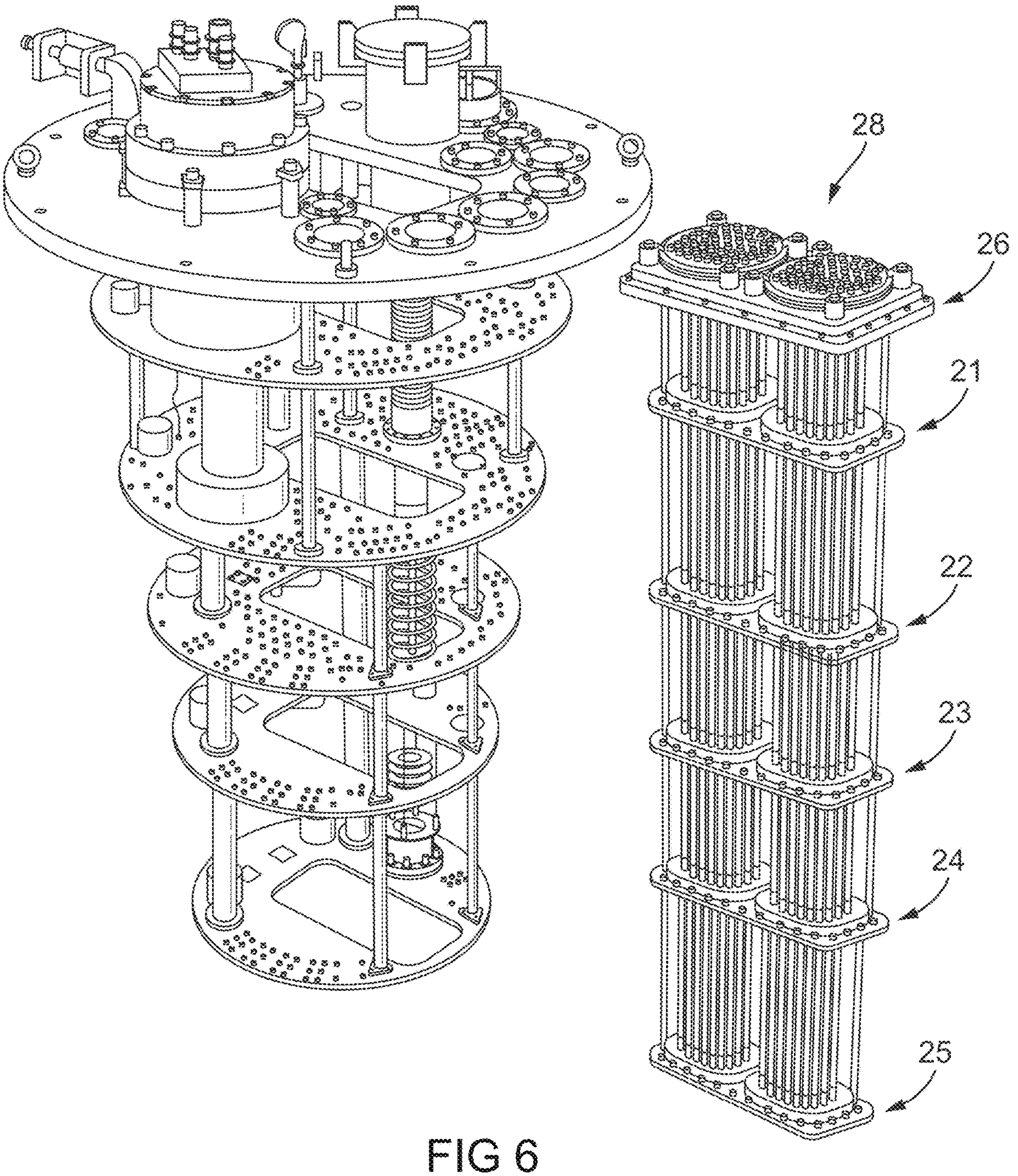
FIG. 6 is an exploded view of a cryogenic cooling system in accordance with the first embodiment of the invention with experimental services attached.

Experimental services can be mounted to the cryogenic cooling system. FIG. 6 illustrates the cryogenic cooling system according to the first embodiment with experimental services mounted to the secondary insert 28. Examples of experimental services may include wiring which may be RF wiring, ultra-high vacuum components, electrical devices (such as attenuators, filters, circulators or other microwave components, amplifiers, resistors, transistors, thermometers, capacitors, inductors), or any other experimental services required for a chosen experiment. The experimental services illustrated in FIG. 6 are coaxial wires.

As described above, secondary inserts may be wholly or partially demounted from a cryogenic cooling system and inserted into another cryogenic cooling system. There may be a misalignment between each inner secondary plate 21-25 and the corresponding inner primary plate 11-15 when the secondary insert 28 is brought into a mounted position, which can lead to poor thermal contact. In order to ensure good thermal contact, the cryogenic cooling system comprises adjustment members. Possible adjustment members will now be described with reference to FIGS. 7-12.

Figure 7:
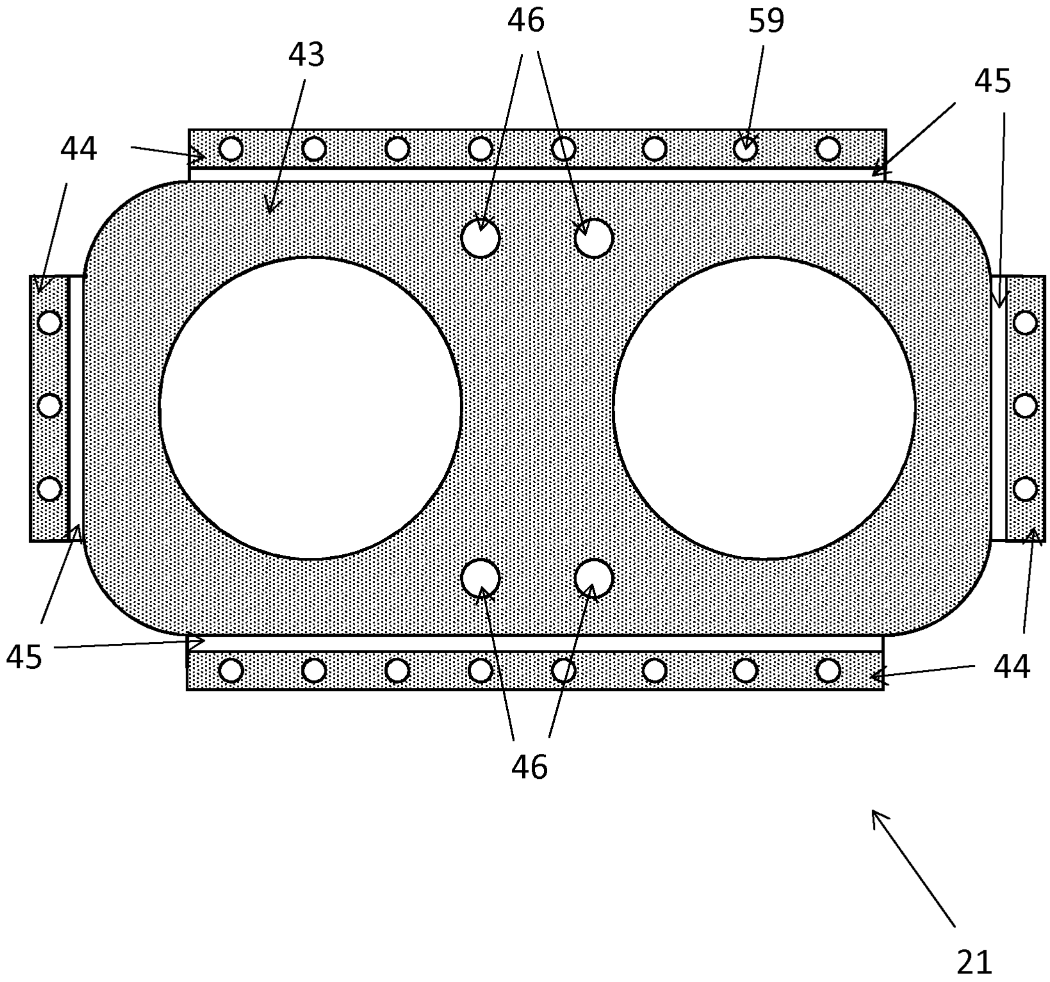
FIG. 7 is a schematic illustration of a secondary plate from a cryogenic cooling system in accordance with the first embodiment of the invention.

FIG. 7 schematically illustrates a front view of an inner secondary plate in accordance with the first embodiment. Although described below in relation to the first inner secondary plate 21, the description may be applicable to any one or more of the inner secondary plates 21-25 of the secondary insert 28. The first inner secondary plate 21 has a rigid central part 43. There are flanges 44 along each side of the rigid central part 43, arranged in the plane of the first secondary plate 21. In this embodiment, each flange 44 has secondary holes 59 distributed evenly along the length of the flange 44. The holes may be tapped or untapped. A matching series of holes is positioned on the corresponding primary plate (see FIGS. 8(*a*) and 8(*b*)) so that the first inner secondary plate 21 can be mounted to the first inner primary plate 11 using screws or any suitable attachment mechanism.

The flanges 44 are separated from the rigid central part 43 by a linking portion 45. The linking portion 45 is a relatively thin strip of the first inner secondary plate 21 extending along the length of the flange 44 and which forms a pivot about which the flange 44 can move. The first inner secondary plate 21 further accommodates four receiving holes 46 for positioning the secondary rods 27, although of course the number of receiving holes 46 may vary depending on the number of secondary rods 27 used.

In the first embodiment, the flanges 44 are configured to deform when a load is applied so as to cause the first inner primary plate 11 and the first inner secondary plate 21 to be brought into conductive thermal contact. Localised deformation allows rigid experimental apparatus to be mounted to the secondary insert 28, such as an ultra-high vacuum port. Such rigid apparatus may, once mounted, effectively determine the separation between two or more of the inner or outer secondary plates 21-25, 26. In this embodiment, the rigid apparatus is mounted to the rigid central part 43 of the first inner secondary plate 21, and the flanges 44 provide a deformable portion thus forming the adjustment members. The localised deformation of the flanges 44 accommodates any misalignment between the first inner primary plate 11 and the first inner secondary plate 21.

The inclusion of a rigid central part 43 of an inner secondary plate advantageously allows rigid experimental apparatus to remain unaffected by any adjustment required whilst ensuring effective thermalisation between the secondary insert 28 and the primary insert 18.

Figure 8A:
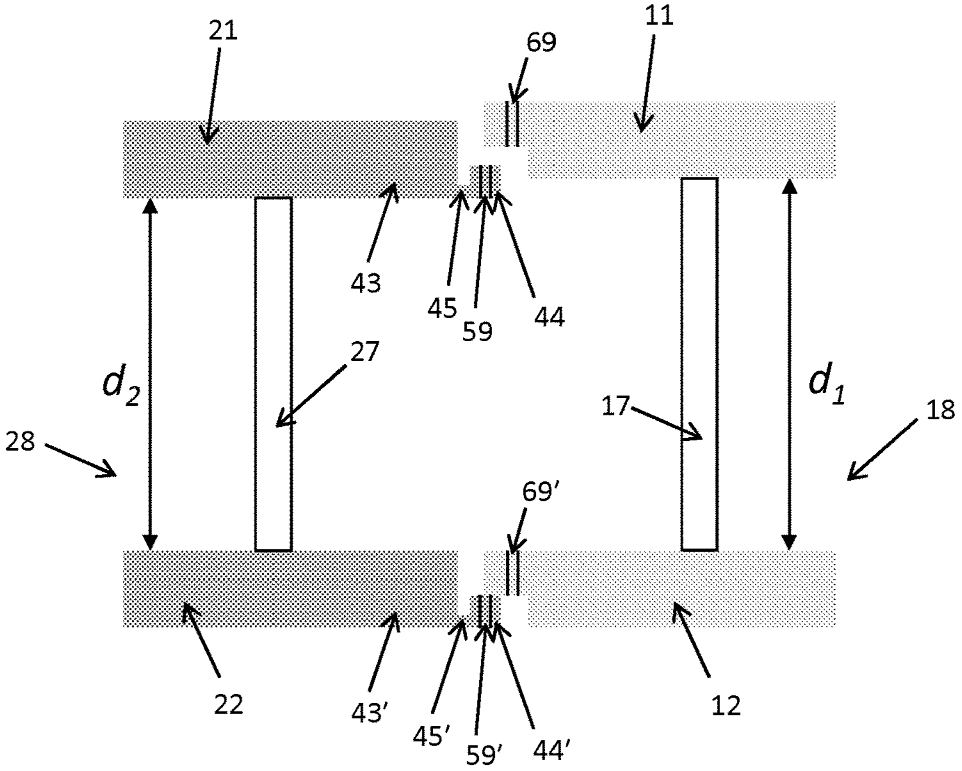
FIG. 8(*a*) is a schematic illustration of part of a cryogenic cooling system in accordance with the first embodiment of the invention before thermal connection is made.
Figure 8B:
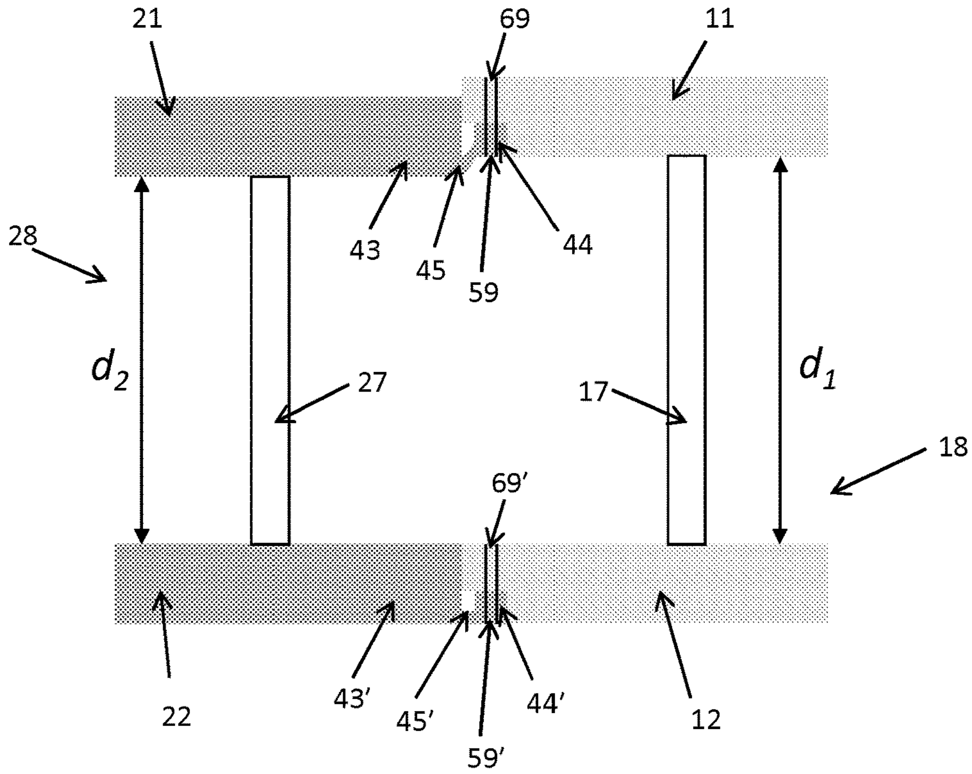

FIGS. 8(*a*) and 8(*b*) schematically illustrate a side view of a part of a cryogenic cooling system in accordance with the first embodiment during a mounting process. FIG. 8(*a*) illustrates a portion of the secondary insert 28 in a demounted state and FIG. 8(*b*) illustrates the portion of the secondary insert 28 in a mounted state, with the adjustment member in use. FIGS. 8(*a*) and 8(*b*) depict portions of the first inner secondary plate 21, the second inner secondary plate 22, the first inner primary plate 11 and the second inner primary plate 12. However, the description applies to any adjacent inner plates in the secondary insert 28 and the corresponding plates in the primary insert 18.

The first inner secondary plate 21 comprises a rigid central part 43, a flange 44 and a linking portion 45. The second secondary plate 22 comprises a rigid central part 43', a flange 44' and a linking portion 45'. Primed reference numerals are used to designate similar apparatus features between the second inner secondary plate 22 and the first inner secondary plate 21. The first and second inner secondary plates 21, 22 both take the form shown by FIG. 7. The first inner primary plate 11 is connected to the second inner primary plate 12 by a primary rod 17. Typically, more than one primary rod 17 will be used to connect adjacent plates of the primary insert 18, but only one is shown here for clarity.

FIG. 8(*a*) schematically illustrates a portion of the secondary insert 28 and the corresponding portion of the primary insert 18 when the secondary insert 28 is in a demounted state. In a demounted state, the separation between the first inner secondary plate 21 and the second inner secondary plate 22 is $d_2$. The separation between the first inner primary plate 11 and the second inner primary plate 12 is $d_1$, wherein $d_1>d_2$. In a different example, the misalignment may be in the opposite direction, i.e $d_1<d_2$. The relative lateral positioning in FIG. 8(*a*) is illustrative only, and is to show the vertical misalignment clearly. The misalignment is between the first inner secondary plate 21 and the first inner primary plate 11. The first and second inner primary plates 11, 12 comprise a stepped portion along the periphery through which primary holes 69, 69' extend. The secondary holes 59, 59' in the first and second inner secondary plates 21, 22 are configured to align with the primary holes 69, 69' in the first and second inner primary plates 11, 12 respectively.

In an alternative embodiment, the flanges may be positioned on the plates of the primary insert 18, instead of the secondary insert 28. This may be particularly advantageous if there are multiple interchangeable secondary inserts 28 for a cryogenic cooling system, some of which may not comprise adjustment members. In another alternative embodiment, the flanges 44 may be positioned on the plates of the primary insert 18 and the secondary insert 28. This may advantageously allow a larger possible misalignment as the deformation could occur on both sides.

FIG. 8(*b*) schematically illustrates the portion of the secondary insert 28 and the corresponding portion of the primary insert 18 of FIG. 8(*a*) when the secondary insert 28 is in a mounted state. In FIG. 8(*b*) the secondary holes 59, 59' are aligned with the primary holes 69, 69'. The flange 44 and the linking portion 45 are in a deformed position, deformed to cause the first inner primary plate 11 and the first inner secondary plate 21 to be brought into conductive thermal contact. The flange 44 is thus in area contact with the first inner primary plate 11 along the stepped portion of the first inner primary plate 11. The planar regions of the stepped portion of the first inner primary plate 11 conform to the flange 44 of the first inner secondary plate 21.

In this embodiment, the deformation of the flanges 44, 44' can accommodate the misalignment between $d_1$ and $d_2$ whilst the rigid central parts 43, 43' of the first inner secondary plate 21 and the second inner secondary plate 22 remain in a fixed position with respect to each other. The first inner primary plate 11 and the second inner primary plate 12 also remain in a fixed position with respect to each other before and after the mounting process.

Figure 9A:
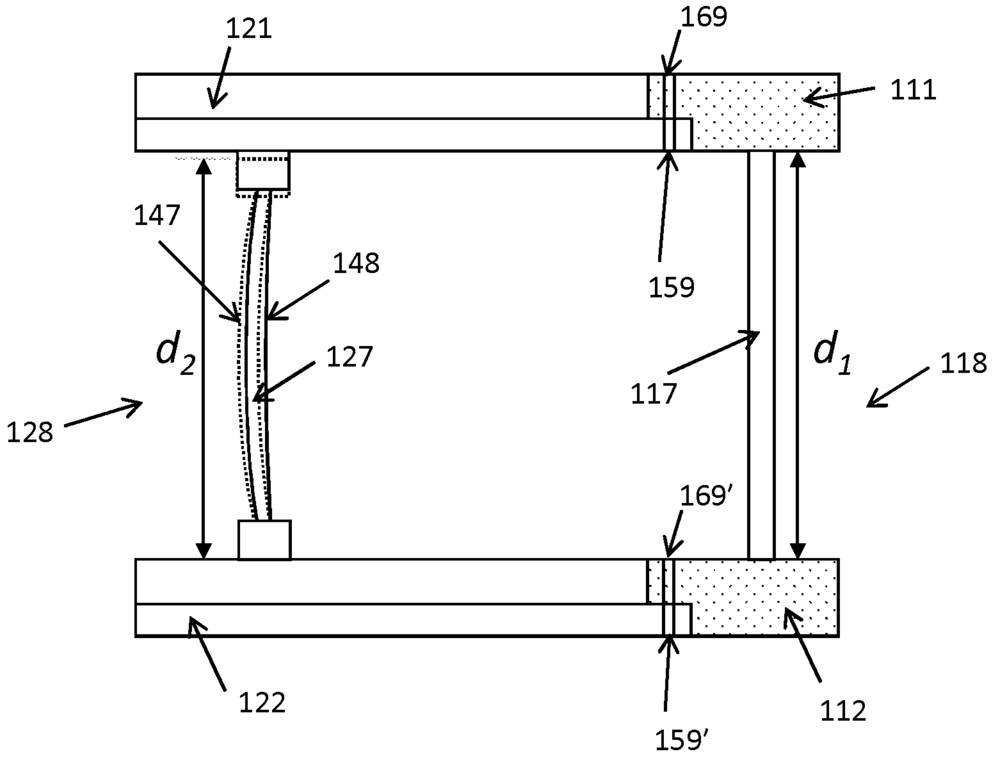
FIG. 9(*a*) is a first schematic illustration of part of a cryogenic cooling system in accordance with a second embodiment of the invention.
Figure 9B:
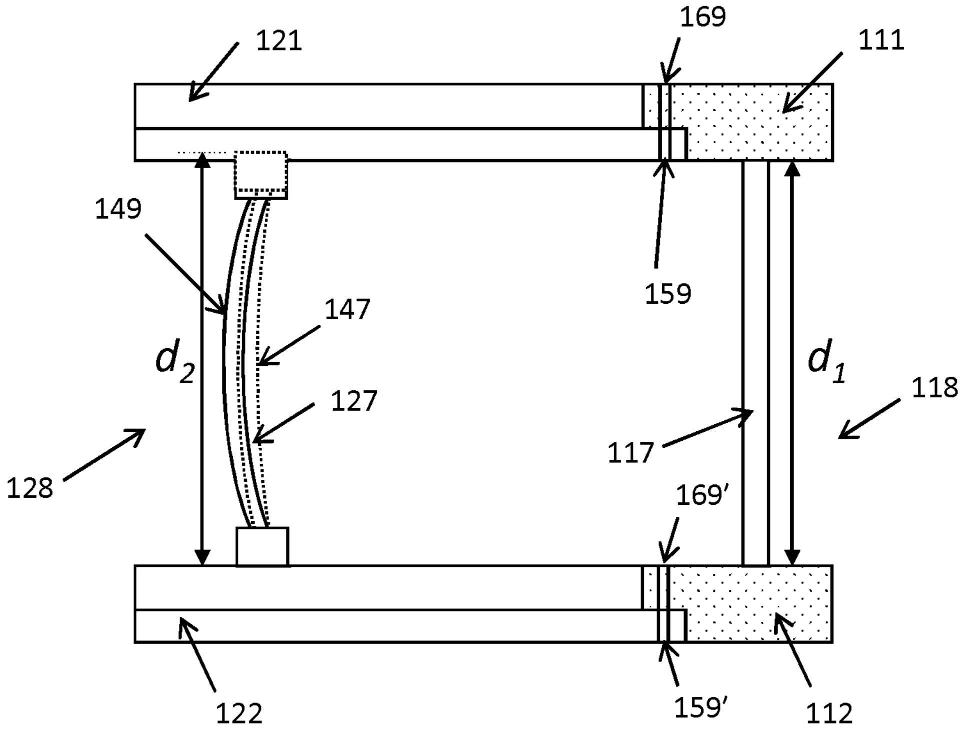

FIGS. 9(*a*) and 9(*b*) schematically illustrate a side view of a part of a cryogenic cooling system in accordance with a second embodiment, showing a portion of a secondary insert 128 in a mounted state, with an adjustment member in use. The cryogenic cooling system takes a similar form to that described in the first embodiment, although the adjustment members provided are different. Each of FIGS. 9(*a*) and 9(*b*) show a first inner secondary plate 121 connected to a second inner secondary plate 122 by a secondary rod 127 and a first inner primary plate 111 connected to a second inner primary plate 112 by a primary rod 117. Typically, further primary rods 117 and further secondary rods 127 are used, but for clarity only one is shown in FIGS. 9(*a*) and 9(*b*). With the secondary insert 128 shown in a mounted position, the secondary holes 159, 159' are aligned with the primary holes 169, 169'.

In the second embodiment, the secondary rods 127 are configured to deform when a compressive or tensile load is applied so as to adjust the separation between the adjacent inner secondary plates 121, 122. This movement accommodates any misalignment between the corresponding plates of the primary and secondary inserts 118, 128. In this embodiment, the primary rods 117 are rigid and therefore the separation between adjacent plates in the primary insert 118 is fixed. The secondary rods 127 are formed from stainless steel and curved to allow deformation as described. The deformation of the secondary rods 127 causes each of the inner secondary plates 121-125 to be brought into conductive thermal contact with the corresponding inner primary plates 111-115.

In FIG. 9(*a*), the separation between the first inner secondary plate 121 and the second inner secondary plate 122 in a demounted state, $d_2$, is less than the separation between the first inner primary plate 111 and the second inner primary plate 112, $d_1$, i.e. $d_2<d_1$. The secondary rod 127 is in a first position 147, indicated in FIG. 9(*a*) using dashed lines, when the secondary insert 128 is in a demounted state. The secondary rods 127 are configured to be extended in response to a tensile load to a second position 148, indicated in FIG. 9(*a*) using a solid line, in which the first and second inner secondary plates 121, 122 are separated further to enable good thermal contact between the first and second inner primary plates 111, 112 respectively along the contact surfaces.

In FIG. 9(*b*), the separation between the first inner secondary plate 121 and the second inner secondary plate 122 in a demounted state, $d_2$, is greater than the separation between the first inner primary plate 111 and the second inner primary plate 112, $d_1$, i.e. $d_2>d_1$. The secondary rod 127 is in a first position 147, indicated in FIG. 9(*b*) using dashed lines, when the secondary insert 128 is in a demounted state. The secondary rods 127 are configured to be compressed in response to a compressive load to a third position 149, indicated in FIG. 9(*b*) using a solid line, in which the first and second inner secondary plates 121, 122 are brought into good thermal contact with the first and second inner primary plates 111, 112 respectively.

In the second embodiment as described above with reference to FIGS. 9(*a*) and 9(*b*), the secondary rods 127 can accommodate the misalignment between corresponding inner plates of the primary insert 118 and secondary insert 128 of the cryogenic cooling system. The secondary rods 127 are configured to adjust the separation between adjacent secondary plates in order to bring each plate of the secondary insert 128 into alignment with each plate of the primary insert 118.

In an alternative embodiment, the primary rods may be configured to deform when a compressive or tensile load is applied, as described above in relation to the secondary rods 127, and the secondary rods may be rigid thus fixing the position of the inner and outer secondary plates with respect to one another. This may make the secondary insert more secure in a demounted state.

Figure 10A:
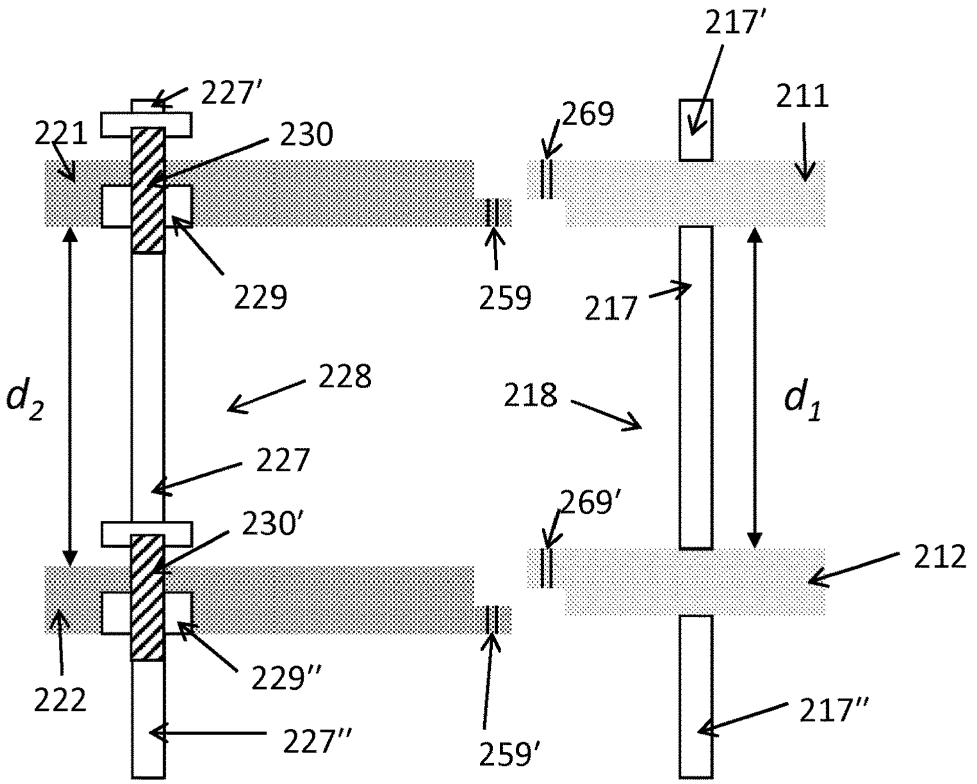
FIG. 10(*a*) is a schematic illustration of part of a cryogenic cooling system in accordance with a third embodiment of the invention before thermal connection is made.
Figure 10B:
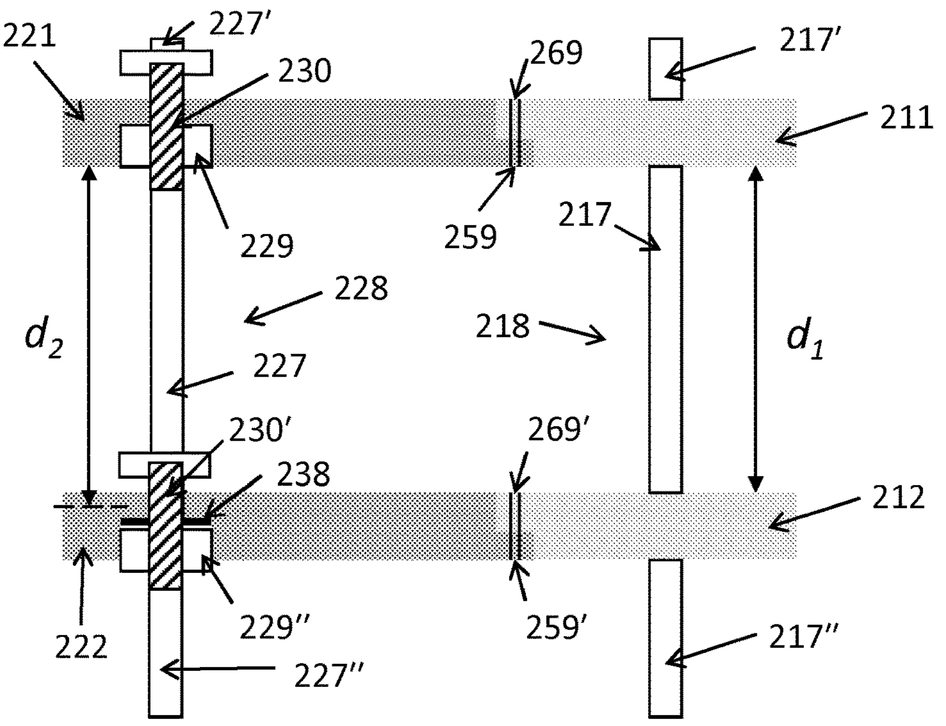

FIGS. 10(*a*) and 10(*b*) schematically illustrate a side view of a part of a cryogenic cooling system in accordance with a third embodiment. Similar to the second embodiment (FIGS. 9(*a*) and 9(*b*)) and unlike the first embodiment (FIGS. 8(*a*) and 8(*b*)), the third embodiment comprises an adjustment member configured to adjust the separation between adjacent plates of an insert. FIG. 10(*a*) illustrates a portion of a secondary insert 228 in a demounted state, whereas FIG. 10(*b*) illustrates the portion of the secondary insert 228 in a mounted state, with the adjustment member in use. FIGS. 10(*a*) and 10(*b*) depict a first inner secondary plate 221, a second inner secondary plate 222, a first inner primary plate 211 and a second inner primary plate 212.

In FIGS. 10(*a*) and 10(*b*), the first inner secondary plate 221 is connected to the second inner secondary plate 222 by a secondary rod 227. An upper secondary rod 227' connects the first inner secondary plate 221 to the outer secondary plate (not shown). A lower secondary rod 227" connects the second inner secondary plate 222 to the third inner secondary plate (not shown). Each of the secondary rods 227, 227', 227" comprises a shoulder 229, 229" provided at the proximal end of each rod 227, 227', 227" and adapted to receive a grub screw 230, 230'. The first inner primary plate 211 is connected to the second inner primary plate 212 by a primary rod 217. An upper primary rod 217' connects the first inner primary plate 211 to the outer primary plate 216 (not shown). A lower primary rod 217" connects the second inner primary plate 212 to the third inner primary plate 213 (not shown).

FIG. 10(*a*) schematically illustrates a portion of the secondary insert 228 and the corresponding portion of the primary insert 218 when the secondary insert 228 is in a demounted state. Secondary holes 259, 259' are configured to align with primary holes 269, 269' when the secondary insert 228 is in a mounted state, with a fastening member extending between them. The primary holes 269, 269' and/or the secondary holes 259, 259' may be threaded, or may form clearance holes, for example where the fastening member is used in conjunction with a backing nut. In FIG. 10(*a*), the separation between the first inner secondary plate 221 and the second inner secondary plate 222 in a demounted state, $d_2$, is greater than the separation between the first inner primary plate 211 and the second inner primary plate 212, $d_1$, i.e. $d_2>d_1$. The relative lateral positioning in FIG. 10(*a*) is illustrative only, and is to show the vertical misalignment clearly. The misalignment is between the second inner secondary plate 222 and the second inner primary plate 212.

In a demounted state, the first inner secondary plate 221 and the second inner secondary plate 222 are positioned on the shoulders 229, 229" of the secondary rod 227 and lower secondary rod 227" respectively. A first grub screw 230 is positioned between the secondary rod 227 and the upper secondary rod 227'. An upper portion of the secondary rod 227 and a lower portion of the upper secondary rod 227' are tapped so as to engage with the first grub screw 230. A second grub screw 230' is positioned between the secondary rod 227 and the lower secondary rod 227". An upper portion of the lower secondary rod 227" and a lower portion of the secondary rod 227 are tapped so as to accommodate the second grub screw 230'. It is this combination of the tapped portion of a secondary rod and the corresponding grub screw with which it engages that forms the adjustment member in this embodiment. In an alternative embodiment, the primary rods may be fitted with an adjustment mechanism as described for the secondary rods or both the primary rods and the secondary rods may be fitted with such adjustment mechanisms.

FIG. 10(*b*) schematically illustrates the portion of the secondary insert 228 and the corresponding portion of the primary insert 218 as illustrated in FIG. 10(*a*) when the secondary insert 228 is in a mounted state. The secondary holes 259, 259' and the primary holes 269, 269' are aligned, and the corresponding plates are thermally linked with a high thermal conductance. The separation between the first inner secondary plate 221 and the second inner secondary plate 222 is adjusted to align with the separation between the first inner primary plate 211 and the second inner primary plate 212. In this embodiment, the misalignment is accommodated by separating the second inner secondary plate 222 from the shoulder 229". In some embodiments this could be achieved by rotation of the secondary rod 227. In the present embodiment the act of adjusting a fastening member extending through primary holes 269' into the corresponding secondary holes 259', lifts the second inner secondary plate 222 off the shoulder 229". It should be appreciated therefore that unlike in the first and second embodiments, the adjustment members of the third embodiment facilitate movement of the second inner secondary plate 222 with respect to the secondary rod 227, along the direction of the secondary rod 227. Consequently, a thermalising shim 238 is positioned between the secondary rod 227 and the second inner secondary plate 222. The thermalising shim 238 provides mechanical support and a thermal connection between the secondary rod 227 and the second inner secondary plate 222, and will be further discussed in detail with reference to FIG. 13.

Figure 11:
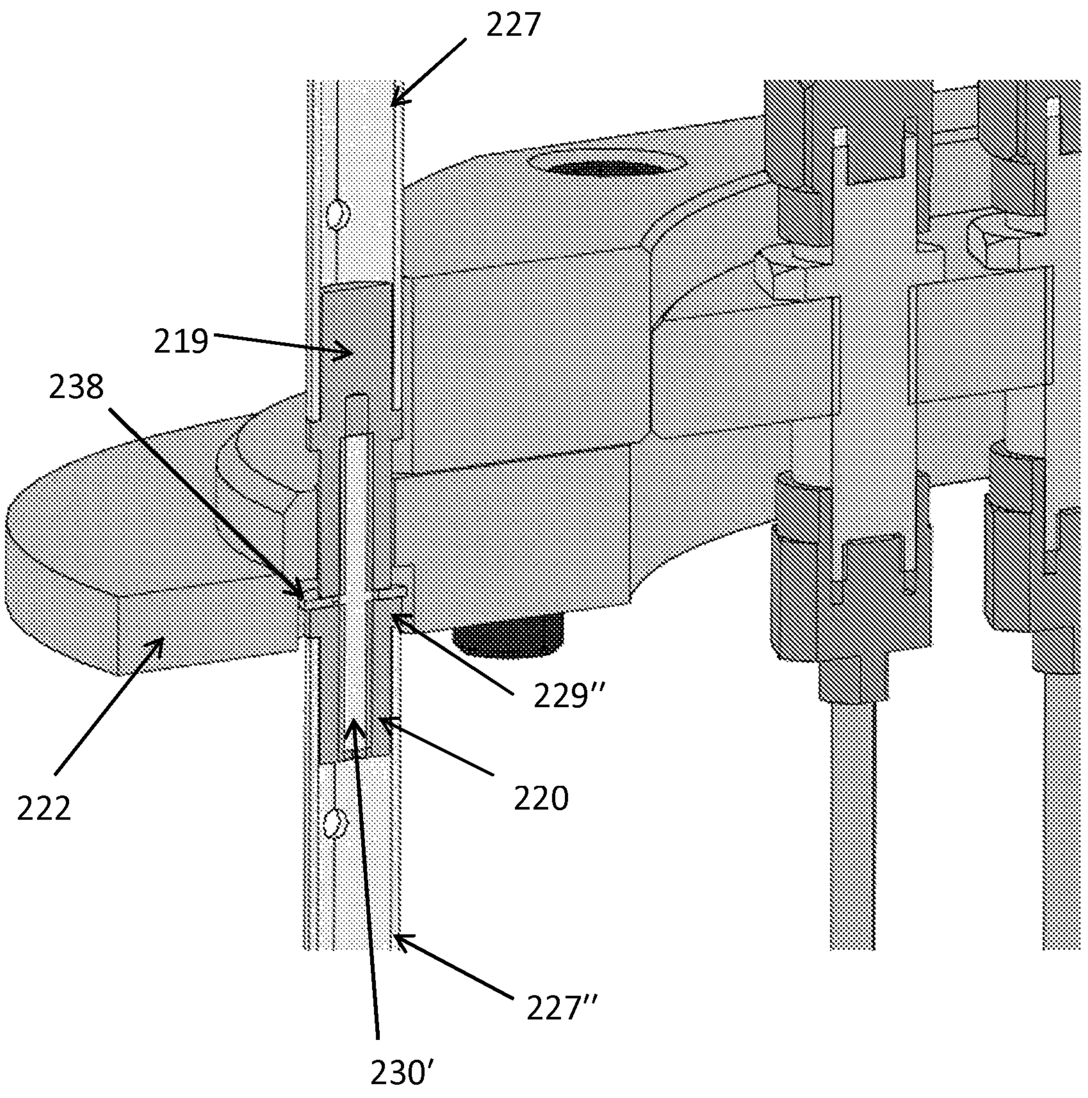
FIG. 11 is a first cross-sectional view of part of a cryogenic cooling system in accordance with the third embodiment of the invention.

FIG. 11 illustrates a cross-sectional view of a portion of a secondary insert plate according to the third embodiment as illustrated in FIGS. 10(*a*) and 10(*b*). Although the following describes the second inner secondary plate 222, the description may apply to any of the inner secondary plates. FIG. 11 shows a second inner secondary plate 222, a secondary rod 227 and a lower secondary rod 227". There is a first threaded insert 219 arranged between the secondary rod 227 and the second inner secondary plate 222. The first threaded insert 219 extends into the hollow secondary rod 227 at the proximal end and extends into the second inner secondary plate 222 at the distal end. A second threaded insert 220 is arranged between the lower secondary rod 227" and the second inner secondary plate 222. The second threaded insert 220 has a shoulder 229" portion at its proximal end, which extends into the second inner secondary plate 222. At its distal end the second threaded insert 222 extends into the hollow lower secondary rod 227".

Figure 12:
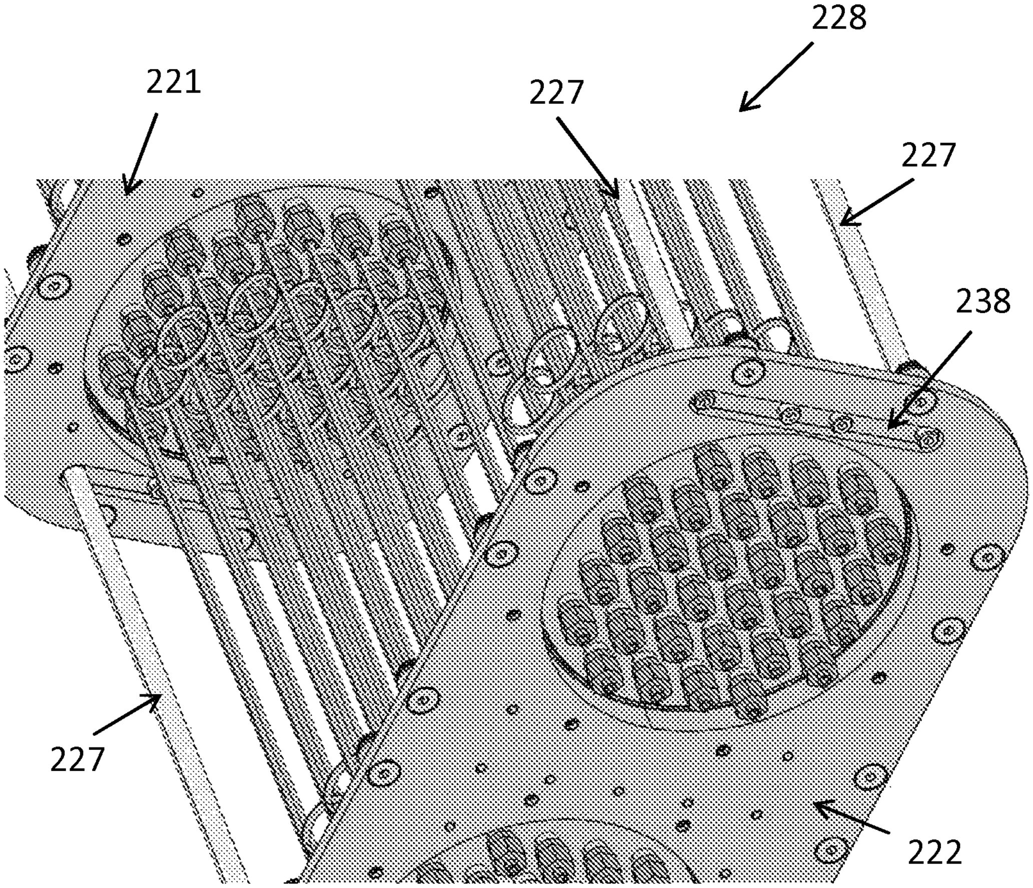
FIG. 12 is a perspective view of part of a cryogenic cooling system in accordance with the third embodiment of the invention.

In this embodiment, the first threaded insert 219 and the second threaded insert 220 are threaded or tapped so as to accommodate the second grub screw 230'. In alternative embodiments, the grub screw can be a set screw or any screw suitable for adjusting the separation between the secondary rod 227 and the lower secondary rod 227". The first threaded insert 219 and the second threaded insert 220 are formed from a material with a high thermal conductivity at the operational base temperature of the relevant thermal stage, such as brass or copper. A thermalising shim 238 is again positioned between the secondary rod 227 and the second inner secondary plate 222. This is also visible in FIG. 12, which provides a perspective view of a portion of a demounted secondary insert 228 in accordance with the third embodiment. In FIG. 12, experimental services are mounted to the secondary insert 228. In particular, the experimental services shown are coaxial wires connected to the second inner secondary plate 222 and the first inner secondary plate 221.

Figure 13:
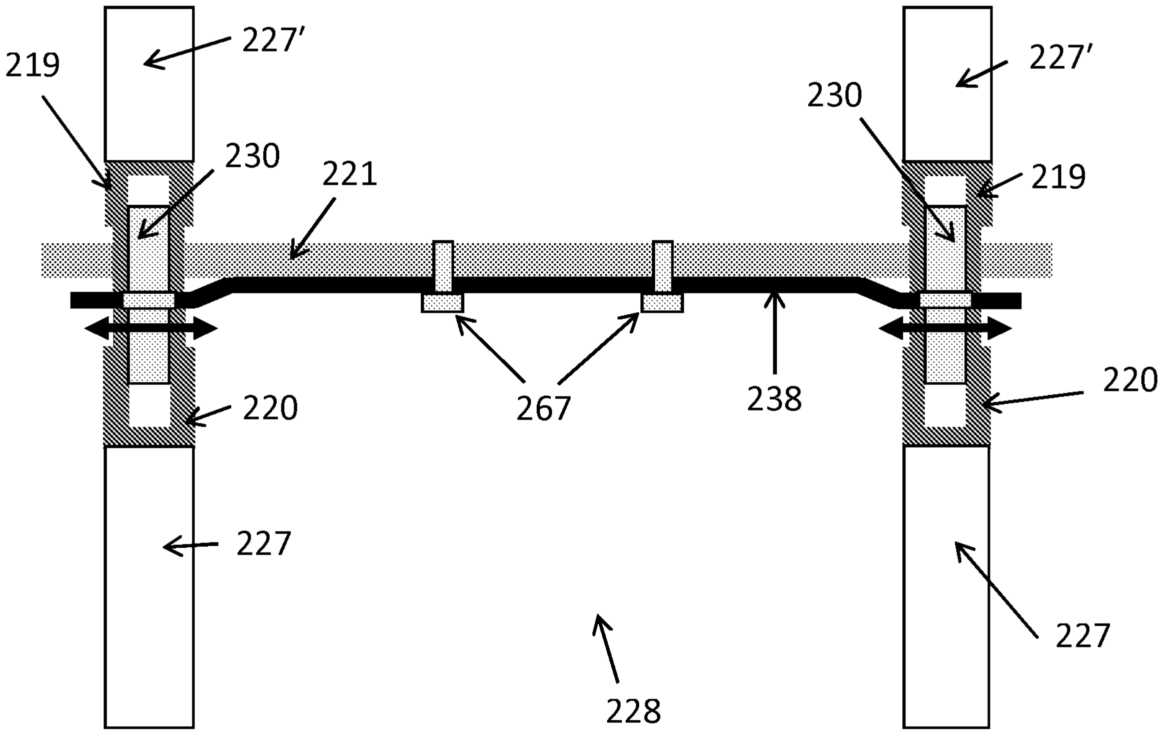
FIG. 13 is a second cross-sectional view of part of a cryogenic cooling system in accordance with the third embodiment of the invention.

FIG. 13 schematically illustrates a cross-sectional view of a part of a cryogenic cooling system in accordance with the third embodiment, depicting the deformation of the thermalising shim 238 when the secondary insert 228 is in a mounted state. The inner secondary plates are moveable within the secondary insert 228 in the direction of the secondary rods to accommodate a misalignment. In FIG. 13, the first inner secondary plate 221 is shown with two secondary rods 227 and two upper secondary rods 227'. The corresponding primary plate is not shown for clarity.

A thermalising shim 238 connects the secondary rods 227, 227' to the first inner secondary plate 221, providing mechanical stability to the arrangement when the first inner secondary plate 221 is moved along the secondary rods 227, 227'. In this embodiment, the thermalising shim 238 is formed from a material having a high thermal conductivity at the operational base temperature of the relevant thermal stage, such as brass or copper, and further provides effective thermalisation of the secondary rods 227, 227'. The thermalising shim 238 is configured to thermally couple the ends of the secondary rods 227' to the inner secondary plate 221. Advantageously, thermalisation of the secondary rods 227 and primary rods 217 at each thermal stage 201-205 reduces the time required to cool the cryogenic cooling system from room temperature to an operational base temperature. It also reduces any unwanted heat transfer between a warm end of the secondary insert and a cold end along the secondary rods 227. This is achieved by increasing the thermal conductance between the secondary rods 227 and the secondary plates, in particular where relative movement between these components is possible.

The grub screw 230 has a radial protrusion around which the thermalising shim 238 is positioned. The outer holes in the thermalising shim 238 are slotted, allowing movement of the shim perpendicular to the secondary rods 227, 227' as indicated by the arrows. When positioned, the thermalising shim 238 is held in place between the first and second threaded inserts 219, 220 by a clamping force. The thermalising shim is also fastened securely to the first inner secondary plate 221 using shim screws 267. The thermalising shim 238 is flexible such that it maintains physical contact with the first inner secondary plate 221 and the secondary rods 227, 227', ensuring effective thermalisation of the secondary rods 227, 227' when the first inner secondary plate 221 is moved with respect to the secondary rods 227, 227'. This deformation of the thermalising shim 238 is visible in FIG. 13.

Figure 14:
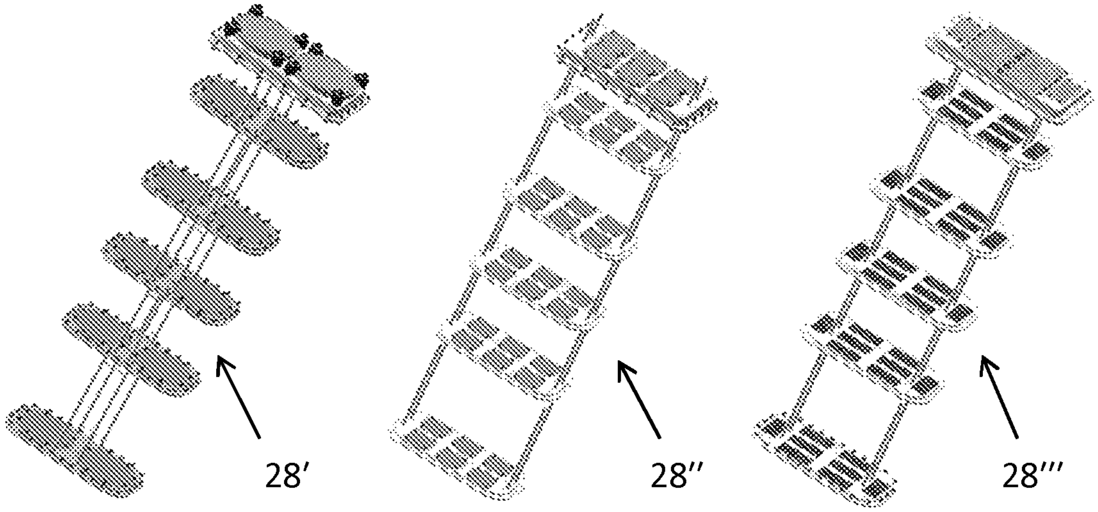
FIG. 14 is a perspective view of three exemplary secondary inserts for use in a cryogenic cooling system in accordance with an embodiment of the invention.

FIG. 14 illustrates exemplary secondary inserts 28', 28", 28'" for use with primary inserts in accordance with the previous embodiments. In each case, a number of ports are shown which are axially aligned between plates. However, as shown the secondary insert can take a variety of forms. It may be advantageous to have more than one secondary insert wherein one of the secondary inserts has a different arrangement of ports. In this case, the same cryogenic cooling system could be used for more than one type of experiment, by switching one secondary insert configured with a first arrangement for another secondary insert configured with a second arrangement.

In further embodiments any combination of the adjustment members previously described may be used alone or in combination.

As will be appreciated, a cryogenic cooling system is therefore provided in which a secondary insert can be demounted from the system whilst achieving effective thermalisation in a mounted position. The removal of the secondary insert allows for remote assembly, testing and set-up. Furthermore, the system has additional flexibility due to the ability to provide modular upgrades in the form of an upgraded secondary insert. The effective thermalisation, which is important for low temperature experiments, is achieved using dedicated adjustment members as described.

The invention claimed is:

1. A cryogenic cooling system comprising:

a primary insert comprising:

a plurality of primary plates, each primary plate having a primary contact surface; and one or more primary connecting members arranged so as to connect the plurality of primary plates;

a demountable secondary insert comprising:

a plurality of secondary plates, each secondary plate having a secondary contact surface; and one or more secondary connecting members arranged so as to connect the plurality of secondary plates such that the secondary insert is self-supporting; and one or more adjustment members;

wherein the one or more adjustment members are configured such that, when the secondary insert is mounted to the primary insert, the adjustment members cause the primary and secondary contact surfaces of the respective primary and secondary plates to be brought into conductive thermal contact; and wherein the one or more adjustment members comprise one or more flanges forming part of a respective primary plate or secondary plate.

2. The system according to claim 1, wherein the one or more adjustment members form part of one or both of the primary insert and the secondary insert.

3. The system according to claim 1, wherein the said conductive thermal contact is provided by area contact between conformal planar regions of the respective primary and secondary contact surfaces.

4. The system according to claim 1, wherein the one or more adjustment members are configured to accommodate a misalignment between each of the plurality of secondary plates of the demountable secondary insert and the corresponding primary plate of the primary insert.

5. The system according to claim 4, wherein when the secondary insert is in a demounted state, the secondary plates are spatially positioned with respect to one another in a secondary configuration, and the primary plates of the primary insert are spatially positioned with respect to one another in a primary configuration; and wherein the misalignment is the offset between the plane of a secondary plate and the plane of the corresponding primary plate in the respective primary and secondary configurations.

6. The system according to claim 5, wherein the respective primary and secondary configurations are maintained when the demountable secondary insert is in a mounted state.

7. The system according to claim 5, wherein the one or more adjustment members cause one or both of the primary or secondary configurations to be adjustable so as to cause the conductive thermal contact.

8. The system according to claim 1, wherein operation of the adjustment member does not change a separation between adjacent primary plates of the primary insert or adjacent secondary plates of the secondary insert.

9. The system according to claim 1, wherein one or more of the plurality of secondary plates is configured to accommodate experimental apparatus.

10. The system according to claim 1, wherein the primary insert comprises a dilution refrigerator, a helium-3 refrigerator, or a 1 kelvin pot.

11. The system according to claim 1, wherein one or more of the secondary connecting members are removable such that two or more of the plurality of secondary plates can be detached from the demountable secondary insert as a unitary, self-supporting assembly.

12. A method of operating the system of claim 1, wherein the demountable secondary insert comprises a first secondary plate, a second secondary plate and a third secondary plate, a first secondary connecting member connecting the first secondary plate to the second secondary plate, and a second secondary connecting member connecting the second secondary plate to the third secondary plate, and wherein the primary insert comprises three primary plates, each said primary plate corresponding to a respective secondary plate of the secondary insert, the method comprising:

mounting the secondary insert to the primary insert such that secondary plates are conductively thermally coupled to the corresponding primary plates using the one or more adjustment members; and partially demounting the secondary insert from the primary insert, wherein partially demounting the secondary insert comprises:

removing the first secondary connecting member from the secondary insert; and removing the second secondary plate, the third secondary plate and the second secondary connecting member from the primary insert as a unitary self-supporting assembly, without removing the first secondary plate from the corresponding plate of the primary insert.

13. The system according to claim 1, further comprising a cooling apparatus attached to the secondary insert.

14. A cryogenic cooling system, comprising:

a primary insert comprising:

a plurality of primary plates, each primary plate having a primary contact surface; and one or more primary connecting members arranged so as to connect the plurality of primary plates;

a demountable secondary insert comprising:

a plurality of secondary plates, each secondary plate having a secondary contact surface; and one or more secondary connecting members arranged so as to connect the plurality of secondary plates such that the secondary insert is self-supporting; and one or more adjustment members;

wherein the one or more adjustment members are configured such that, when the secondary insert is mounted to the primary insert, the adjustment members cause the primary and secondary contact surfaces of the respective primary and secondary plates to be brought into conductive thermal contact; and wherein a change in separation between adjacent primary plates or adjacent secondary plates is achieved by operation of the one or more primary connecting members and/or the one or more secondary connecting members.

15. The system according to claim 14, wherein the one or more adjustment members is configured to allow movement of the one or more primary plates with respect to the one or more said primary connecting members.

16. The system according to claim 14, wherein the one or more adjustment members is configured to allow movement of the one or more secondary plates with respect to the one or more said secondary connecting members.

17. The system according to claim 14, wherein the primary or secondary connecting members are rotatable so as to change the separation between adjacent primary plates or adjacent secondary plates using the one or more adjustment members.

18. The system according to claim 14, wherein the one or more adjustment members form respective flexible portions of the primary or secondary connecting members.

19. The system according to claim 14, wherein one or more of the plurality of secondary plates is configured to accommodate experimental apparatus.

20. The system according to claim 14, wherein the primary insert comprises a dilution refrigerator, a helium-3 refrigerator, or a 1 kelvin pot.

21. The system according to claim 14, wherein one or more of the secondary connecting members are removable such that two or more of the plurality of secondary plates can be detached from the demountable secondary insert as a unitary, self-supporting assembly.

22. A method of operating the system of claim 14, wherein the demountable secondary insert comprises a first secondary plate, a second secondary plate and a third secondary plate, a first secondary connecting member connecting the first secondary plate to the second secondary plate, and a second secondary connecting member connecting the second secondary plate to the third secondary plate, and wherein the primary insert comprises three primary plates, each said primary plate corresponding to a respective secondary plate of the secondary insert, the method comprising:

mounting the secondary insert to the primary insert such that secondary plates are conductively thermally coupled to the corresponding primary plates using the one or more adjustment members; and partially demounting the secondary insert from the primary insert, wherein partially demounting the secondary insert comprises:

removing the first secondary connecting member from the secondary insert; and removing the second secondary plate, the third secondary plate and the second secondary connecting member from the primary insert as a unitary self-supporting assembly, without removing the first secondary plate from the corresponding plate of the primary insert.

23. The system according to claim 14, further comprising a cooling apparatus attached to the secondary insert.

24. A cryogenic cooling system comprising:

a cryostat comprising:

a primary insert comprising:

a plurality of primary plates, each primary plate having a primary contact surface; and one or more primary connecting members arranged so as to connect the plurality of primary plates; and a demountable secondary insert comprising:

a plurality of secondary plates, each secondary plate having a secondary contact surface; and one or more secondary connecting members arranged so as to connect the plurality of secondary plates such that the secondary insert is self-supporting; and a dilution unit mounted to the plurality of secondary plates, wherein the system is configured such that, when the secondary insert is mounted to the primary insert, the respective primary and secondary plates are in conductive thermal contact; and wherein the secondary insert is removable from the ery-ostat and the primary insert.

25. The system according to claim 24, wherein the secondary insert further comprises one or more adjustment members configured such that, when the secondary insert is mounted to the primary insert, the one or more adjustment members cause the primary and secondary contact surfaces of the respective primary and secondary plates to be brought into conductive thermal contact.

26. The system of claim 24, wherein the plurality of secondary plates comprises a first secondary plate, a second secondary plate, a third secondary plate, a fourth secondary plate and a fifth secondary plate, wherein the dilution unit is mounted to the third secondary plate, the fourth secondary plate and the fifth secondary plate.

27. The system of claim 26, further comprising a pulse-tube refrigerator thermally coupled to the first secondary plate and the second secondary plate when the secondary insert is mounted to the primary insert.

28. The system of claim 26, further comprising a pulse-tube refrigerator mounted to the first secondary plate and the second secondary plate.

29. A cryogenic cooling system comprising:

a cryostat which is evacuated in use, the cryostat comprising:

a primary insert comprising:

a plurality of primary plates, each primary plate having a primary contact surface;

a dilution unit thermally coupled to one or more of the primary plates; and one or more primary connecting members arranged so as to connect the plurality of primary plates; and a demountable secondary insert comprising:

a plurality of secondary plates, each secondary plate having a secondary contact surface;

a pulse tube refrigerator mounted to one or more secondary plates of the plurality of secondary plates; and one or more secondary connecting members arranged so as to connect the plurality of secondary plates such that the secondary insert is self-supporting;

wherein the cryogenic cooling system is configured such that, when the secondary insert is mounted to the primary insert, one or more of the secondary plates are thermally conductively coupled to the dilution unit; and wherein an outer secondary plate of the plurality of secondary plates engages with an outer primary plate of the plurality of primary plates to seal the evacuated cryostat.

30. The system of claim 29, further comprising one or more adjustment members forming part of the demountable secondary insert and configured such that, when the secondary insert is mounted to the primary insert, the one or more adjustment members accommodate a misalignment between the secondary plates and the corresponding primary plates, and the one or more adjustment members cause the primary and secondary contact surfaces of the respective primary and secondary plates to be brought into conductive thermal contact.

* * * * *